United States Patent
Nagano

(10) Patent No.: US 8,867,617 B2
(45) Date of Patent: Oct. 21, 2014

(54) IMAGE TRANSMISSION METHOD, IMAGE RECEIVING METHOD, IMAGE TRANSMISSION DEVICE, IMAGE RECEIVING DEVICE, AND IMAGE TRANSMISSION SYSTEM

(75) Inventor: Hidetoshi Nagano, Saitama (JP)

(73) Assignee: Sony Corporation (JP)

( * ) Notice: Subject to any disclaimer, the term of this patent is extended or adjusted under 35 U.S.C. 154(b) by 518 days.

(21) Appl. No.: 12/927,203

(22) Filed: Nov. 9, 2010

(65) Prior Publication Data
US 2011/0122949 A1  May 26, 2011

(30) Foreign Application Priority Data
Nov. 17, 2009  (JP) .............................. P2009-262186

(51) Int. Cl.
*H04N 7/12* (2006.01)
*H04N 11/02* (2006.01)
*H04N 11/04* (2006.01)
*H04N 13/00* (2006.01)
*G06K 9/00* (2006.01)

(52) U.S. Cl.
CPC ....... *H04N 13/0048* (2013.01); *H04N 13/0029* (2013.01); *H04N 13/0059* (2013.01)
USPC ................... 375/240.15; 375/240.08; 348/42; 348/43; 348/148; 382/154

(58) Field of Classification Search
None
See application file for complete search history.

(56) References Cited

U.S. PATENT DOCUMENTS

| 6,377,625 | B1 * | 4/2002 | Kim | 375/240.08 |
| 2004/0189795 | A1 * | 9/2004 | Ezawa | 348/51 |
| 2006/0078224 | A1 * | 4/2006 | Hirosawa | 382/284 |
| 2006/0233237 | A1 * | 10/2006 | Lu et al. | 375/240.03 |
| 2008/0303892 | A1 * | 12/2008 | Kim et al. | 348/42 |
| 2009/0153664 | A1 * | 6/2009 | Higuchi et al. | 348/148 |
| 2009/0315979 | A1 * | 12/2009 | Jung et al. | 348/43 |

FOREIGN PATENT DOCUMENTS

| CN | 1313712 A | 9/2001 |
| JP | 09-138384 A | 5/1997 |
| JP | 2000-036969 A | 2/2000 |
| JP | 2003-045343 A | 2/2003 |

OTHER PUBLICATIONS

Office Action from China Application No. 201010546185.8, dated Nov. 1, 2013.

* cited by examiner

*Primary Examiner* — Joseph Ustaris
*Assistant Examiner* — Ellyar Y Barazesh
(74) *Attorney, Agent, or Firm* — Lerner, David, Littenberg, Krumholz & Mentlik, LLP

(57) ABSTRACT

An image transmission method includes a step of inputting a plurality of different source moving images sequentially. The image transmission method also includes a step of creating a main image for each frame from one of the plurality of different source images. The image transmission method also includes a step of creating a secondary image for each frame from a differential image that expresses the difference between the source moving image from which the main image was created and another source moving image in a different frame. The image transmission method also includes a step of creating an integrated image by combining the main image and the secondary image. The image transmission method also includes a step of transmitting the integrated image to a receiving side.

5 Claims, 33 Drawing Sheets time

IMAGE TRANSMISSION METHOD, IMAGE RECEIVING METHOD, IMAGE TRANSMISSION DEVICE, IMAGE RECEIVING DEVICE, AND IMAGE TRANSMISSION SYSTEM

CROSS-REFERENCE TO RELATED APPLICATION

The present application claims priority from Japanese Patent Application No. JP 2009-262186 filed in the Japanese Patent Office on Nov. 17, 2009, the entire content of which is incorporated herein by reference.

BACKGROUND OF THE INVENTION

1. Field of the Invention

The present invention relates to an image transmission method, an image receiving method, an image transmission device, an image receiving device, and an image transmission system.

2. Description of the Related Art

Methods are known, such as those described in Japanese Patent Application Publication No. JP-A-9-138384, Japanese Patent Application Publication No. JP-A-2000-36969, and Japanese Patent Application Publication No. JP-A-2003-45343, for example, for supplying to a display, in alternation on a specified cycle, a left eye image and a right eye image, between which a disparity exists, and for viewing the images with a pair of eyeglasses that are provided with liquid crystal shutters that are operated in synchronization with the specified cycle.

Further, in existing digital broadcasting, services such as electronic program listings, data broadcasting, and the like are being provided, such that services other than ordinary video and audio programming can be received in accordance with users' wishes.

BRIEF SUMMARY OF THE INVENTION

In these circumstances, demand has grown for services to be enhanced by the adding of new value to video and audio, even in ordinary programming. One method that has been mentioned for adding value to video is to transmit binocular stereoscopic moving images like those described above. Binocular stereoscopic viewing is made possible by transmitting the left eye images and the right eye images and on the receiving side, presenting the left eye images to the user's left eye and the right eye images to the user's right eye.

However, in the transmitting of the binocular stereoscopic moving images, a problem occurs in that one of the spatial resolution and the temporal resolution is poorer than with two-dimensional images, because the volume of data that is transmitted is doubled.

Accordingly, the present invention, in light of the problem that is described above, provides an image transmission method, an image receiving method, an image transmission device, an image receiving device, and an image transmission system that are new and improved and that are capable of transmitting a plurality of source moving images in a state that keeps any decrease in resolution to a minimum.

In order to address the issues that are described above, according to an aspect of the present invention, there is provided an image transmission method that includes a step of inputting a plurality of different source moving images sequentially. The image transmission method also includes a step of creating a main image for each frame from one of the plurality of different source images. The image transmission method also includes a step of creating a secondary image for each frame from a differential image that expresses the difference between the source moving image from which the main image was created and another source moving image in a different frame. The image transmission method also includes a step of creating an integrated image by combining the main image and the secondary image. The image transmission method also includes a step of transmitting the integrated image to a receiving side.

The main image may also be created by reducing the original size of the source moving image.

The secondary image may also be created by reducing the differential image that expresses the difference between the frames.

The secondary image for the current frame may also be created from a differential image that expresses the difference between the other source moving image for the current frame and the other source moving image for the immediately previous frame.

The secondary image may also be created from a differential image that is derived by subtracting from the original other source moving image for the current frame a presumed original image that is derived from a series of images that precede and follow the other source moving image on a time axis.

In a case where the total number of the source moving images is N, the current frame is the K-th source moving image, and the main image is the (K−M)th source moving image, the presumed original image may also be one of the (K−M)th image and the (K+N−M)th image.

In a case where the total number of the source moving images is N, the current frame is the K-th source moving image, the main image is the (K−M)th source moving image, and i and j are integers that are not less than zero, the presumed original image may also be one of a weighted average of a plurality of images that are selected from the (K−N×i−M)th previous image and the (K+N×j+N−M)th following image, a weighted average of a plurality of images that are selected from the (K−1)th previous image and the (K +N×j+N−M)th following image, a motion compensated image that is produced by performing motion compensation on the (K−M)th image, based on the change from the (K−M)th image to the K-th image, a motion compensated image that is produced by performing motion compensation on the (K+N−M)th image, based on the change from the (K+N−M)th image to the K-th image, a weighted average of a plurality of images that are selected from the (K−N×i−M)th previous image and the (K +N×j+N−M)th following image and a series of motion compensated images that are produced by performing motion compensation on each of the plurality of images based on their differences from the K-th image, and a weighted average of a plurality of images that are selected from the (K−1)th previous image and the (K+N×j+N−M)th following image and a series of motion compensated images that are produced by performing motion compensation on each of the plurality of images based on their differences from the K-th image.

The secondary image may also be created by performing correction processing on a differential image that is derived by subtracting from the original other source moving image for the current frame a presumed original image that is derived from a series of images that precede and follow the other source moving image on a time axis. The correction processing may also be processing that creates at least one corrected differential image in relation to a number S of corrected differential images that will be transmitted. A corrected differential image 1 may also be an image that is derived by performing, on a differential image that expresses the difference between a presumed original image and one of an original image and a reduced original image, reduction processing at a reduction ratio that is based on an arrangement within the image that will be transmitted. A corrected differential image n (where n is at least 2 and not greater than S) may also be an image that is derived by performing the reduction processing at the reduction ratio that is based on the arrangement within the image that will be transmitted, the reduction processing being performed on a differential image that is computed by subtracting, from one of the original image and the reduced original image, an enlarged corrected differential image 1 to an enlarged corrected differential image (n−1) that are derived by enlarging the corrected differential image 1 to the corrected differential image (n−1) to the same size as the presumed original image.

An integrated image may also combine a corrected differential image and one of an original image and a reduced original image, and a switching of the arrangement of the individual source moving images may also cause the one of the original image and the reduced original image in a next integrated image to be arranged in the same position as the corresponding one of the original image and the reduced original image in the integrated image and may also cause the corrected differential image in the next integrated image to be arranged in the same position as the corrected differential image in the integrated image.

In order to address the issues that are described above, according to another aspect of the present invention, there is provided an image receiving method that includes a step of receiving an integrated image that includes a main image that is created from one of a plurality of different source images and a secondary image that is created from a differential image that expresses the difference between a source moving image that corresponds to the main image and another source moving image in a different frame. The image receiving method also includes a step of separating the main image and the secondary image from the integrated image. The image receiving method also includes a step of restoring the source moving image that corresponds to the main image. The image receiving method also includes a step of restoring the source moving image that corresponds to the secondary image, based on the main image for an adjacent frame and on the separated secondary image. The image receiving method also includes a step of displaying the source moving images that respectively correspond to the main image and the secondary image.

In order to address the issues that are described above, according to another aspect of the present invention, there is provided an image transmission device that includes an input portion, a main image processing portion, a secondary image processing portion, and an integrated image creation processing portion. A plurality of different source moving images are sequentially input to the input portion. The main image processing portion creates a main image for each frame from one of the plurality of different source images. The secondary image processing portion creates a secondary image for each frame from a differential image that expresses the difference between the source moving image from which the main image was created and another source moving image in a different frame. The integrated image creation processing portion creates an integrated image by combining the main image and the secondary image.

In order to address the issues that are described above, according to another aspect of the present invention, there is provided an image receiving device that includes a separation portion, a main image restoration portion, a secondary image restoration portion, and a display portion. The separation portion receives an integrated image that includes a main image that is created from one of a plurality of different source images and a secondary image that is created from a differential image that expresses the difference between a source moving image that corresponds to the main image and another source moving image in a different frame. The separation portion also separates the main image and the secondary image from the integrated image. The main image restoration portion restores the source moving image that corresponds to the main image. The secondary image restoration portion restores the source moving image that corresponds to the secondary image, based on the main image for an adjacent frame and on the separated secondary image. The display portion displays the source moving images that respectively correspond to the main image and the secondary image.

In order to address the issues that are described above, according to another aspect of the present invention, there is provided an image transmission system that includes an image transmission device and an image receiving device. The image transmission device includes an input portion, a main image processing portion, a secondary image processing portion, and an integrated image creation processing portion. A plurality of different source moving images are sequentially input to the input portion. The main image processing portion creates a main image for each frame from one of the plurality of different source images. The secondary image processing portion creates a secondary image for each frame from a differential image that expresses the difference between the source moving image from which the main image was created and another source moving image in a different frame. The integrated image creation processing portion creates an integrated image by combining the main image and the secondary image. The image receiving device includes a separation portion, a main image restoration portion, a secondary image restoration portion, and a display portion. The separation portion receives an integrated image that includes a main image that is created from one of a plurality of different source images and a secondary image that is created from a differential image that expresses the difference between a source moving image that corresponds to the main image and another source moving image in a different frame. The separation portion also separates the main image and the secondary image from the integrated image. The main image restoration portion restores the source moving image that corresponds to the main image. The secondary image restoration portion restores the source moving image that corresponds to the secondary image, based on the main image for an adjacent frame and on the separated secondary image. The display portion displays the source moving images that respectively correspond to the main image and the secondary image.

In order to address the issues that are described above, according to another aspect of the present invention, there is provided an image receiving method that includes a step of receiving an integrated image that includes a main image that is created from one of a plurality of different source images and a secondary image that is created from a differential image that expresses the difference between a source moving image that corresponds to the main image and another source moving image in a different frame. The image receiving method also includes a step of separating the main image and the secondary image from the integrated image. The image receiving method also includes a step of restoring the source moving image that corresponds to the main image. The image receiving method also includes a step of restoring the source moving image that corresponds to the secondary image, based on the main image for an adjacent frame and on the separated secondary image. The image receiving method also includes a step of displaying the source moving images that respectively correspond to the main image and the secondary image.

In order to address the issues that are described above, according to another aspect of the present invention, there is provided an image transmission device that includes an input portion, a main image processing portion, a secondary image processing portion, and an integrated image creation processing portion. A plurality of different source moving images are sequentially input to the input portion. The main image processing portion creates a main image for each frame from one of the plurality of different source images. The secondary image processing portion creates a secondary image for each frame from a differential image that expresses the difference between the source moving image from which the main image was created and another source moving image in a different frame. The integrated image creation processing portion creates an integrated image by combining the main image and the secondary image.

There is provided an image receiving device that includes a separation portion, a main image restoration portion, a secondary image restoration portion, and a display portion. The separation portion receives an integrated image that includes a main image that is created from one of a plurality of different source images and a secondary image that is created from a differential image that expresses the difference between a source moving image that corresponds to the main image and another source moving image in a different frame. The separation portion also separates the main image and the secondary image from the integrated image. The main image restoration portion restores the source moving image that corresponds to the main image. The secondary image restoration portion restores the source moving image that corresponds to the secondary image, based on the main image for an adjacent frame and on the separated secondary image. The display portion displays the source moving images that respectively correspond to the main image and the secondary image.

There is provided an image transmission system that includes an image transmission device and an image receiving device. The image transmission device includes an input portion, a main image processing portion, a secondary image processing portion, and an integrated image creation processing portion. A plurality of different source moving images are sequentially input to the input portion. The main image processing portion creates a main image for each frame from one of the plurality of different source images. The secondary image processing portion creates a secondary image for each frame from a differential image that expresses the difference between the source moving image from which the main image was created and another source moving image in a different frame. The integrated image creation processing portion creates an integrated image by combining the main image and the secondary image. The image receiving device includes a separation portion, a main image restoration portion, a secondary image restoration portion, and a display portion. The separation portion receives an integrated image that includes a main image that is created from one of a plurality of different source images and a secondary image that is created from a differential image that expresses the difference between a source moving image that corresponds to the main image and another source moving image in a different frame. The separation portion also separates the main image and the secondary image from the integrated image. The main image restoration portion restores the source moving image that corresponds to the main image. The secondary image restoration portion restores the source moving image that corresponds to the secondary image, based on the main image for an adjacent frame and on the separated secondary image. The display portion displays the source moving images that respectively correspond to the main image and the secondary image.

According to the present invention, it is possible to transmit a plurality of source moving images without diminishing the resolution.

BRIEF DESCRIPTION OF THE DRAWINGS

FIG. 1 is a schematic figure for explaining an embodiment of the present invention that shows a moving image of a bouncing ball or the like;

DETAILED DESCRIPTION OF EMBODIMENT

Figure 1:
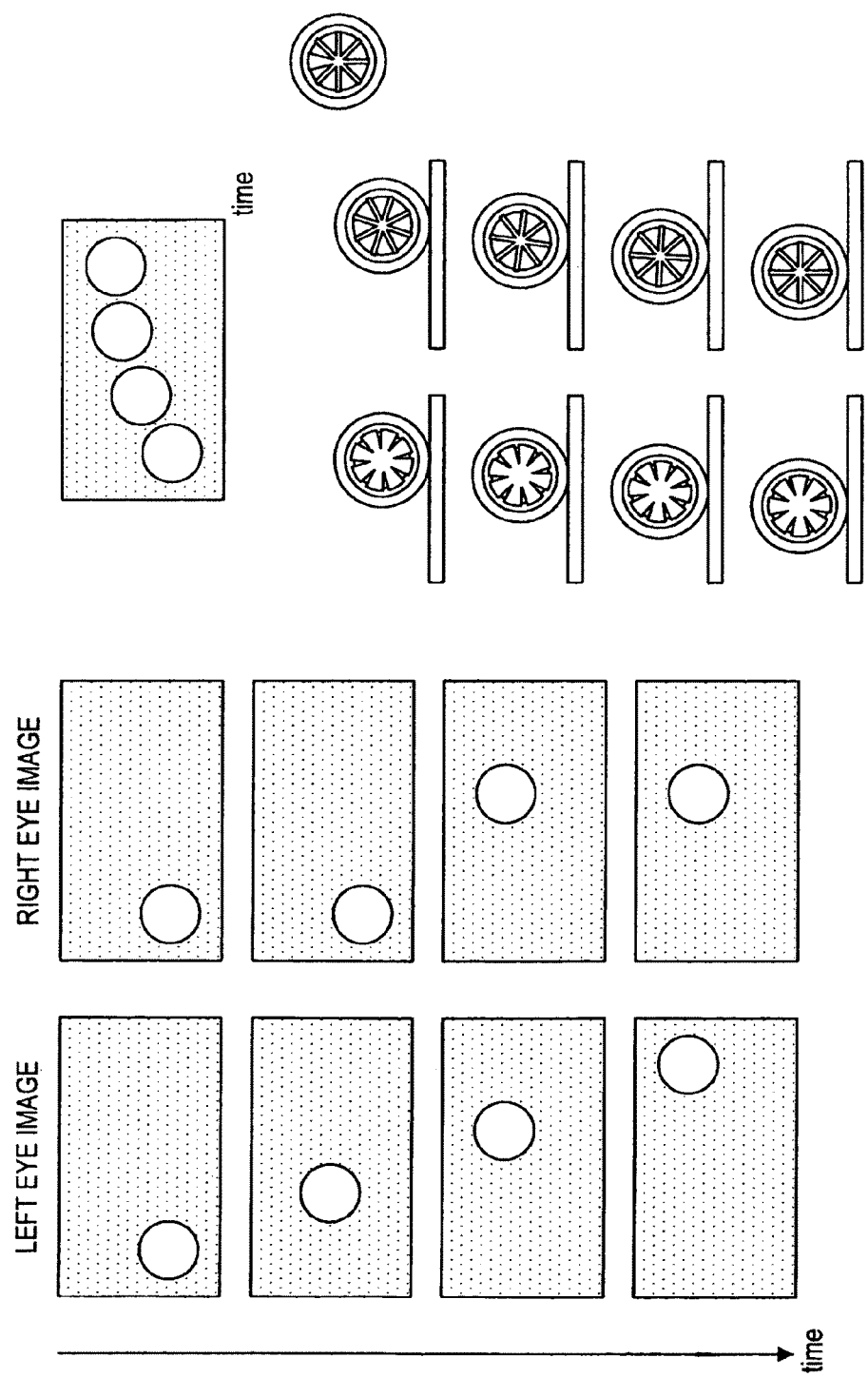

Hereinafter, a preferred embodiment of the present invention will be described in detail with reference to the appended drawings. Note that, in this specification and the appended drawings, structural elements that have substantially the same function and structure are denoted with the same reference numerals, and repeated explanation of these structural elements is omitted.

Note that the explanation will be in the order shown below.
1. First embodiment (Basic configuration of an embodiment according to the present invention)
2. Second embodiment (Example of creating a secondary image using an original image)
3. Third embodiment (Example of creating a presumed original image using motion compensation and weighting)

1. First Embodiment

In cases where binocular stereoscopic moving images are transmitted in an existing video transmission, a frame (field) sequential method that alternately transmits left eye images and right eye images without performing moving image transmission independently for the left eye images and the right eye images, a side-by-side method that transmits the left eye image and the right eye image on the left and the right within a single frame (field), a top-and-bottom method that transmits the left eye image and the right eye image at the top and the bottom within a single frame (field), and the like are used.

These methods make it possible to transmit the left eye images and the right eye images by cutting in half the number of samples in one of the time dimension, the left-right direction, and the top-bottom direction. The methods therefore also cut the resolution in half in one of the time dimension, the left-right direction, and the top-bottom direction.

In a case where the resolution in the time dimension (the temporal resolution) is inadequate, a phenomenon occurs in which the tracking of motion is impaired and the smoothness of motion is lost. When the resolution in either one of the top-bottom direction and the left-right direction (the spatial resolution) is cut in half, a phenomenon occurs in which the realistic quality of the subject (particularly the realistic quality of the subject in a still image) is lost.

It is assumed that monocular images are being transmitted in the existing video transmission, so the volume of data in a case where the binocular stereoscopic moving images are transmitted is doubled if encoding is done at the same compression rate, which creates a trade-off in terms of the diminished resolution in one of the time dimension, the left-right direction, and the top-bottom direction.

The truth of the matter is that, at the present time, no method has been envisioned for suppressing the overall decrease in the resolution, instead of suppressing the decrease in the resolution in one of the dimensions (the time dimension and the spatial dimension), even though the decrease in the resolution occurs in each of the dimensions.

What is known about temporal resolution, spatial resolution, and the properties of human vision will hereinafter be described.

Still Images and Moving Images

In a case where still images are transmitted, it is preferable for the spatial resolution to be high, and transmission by the frame (field) sequential method is considered to be the best. In contrast, in a case where moving images of rapid movements are transmitted, it is preferable for the temporal resolution to be high, and transmission by one of the side-by-side method and the top-and-bottom method, which diminish the resolution of the images in the vertical and horizontal directions, is thought to be the best.

However, the state of images that are captured with an ordinary video camera is that the background is close to being a still image, while the foreground is close to being a moving image, so it cannot be categorically stated that it is desirable to give priority to one of the temporal resolution and the spatial resolution or to sacrifice one of the vertical resolution and the horizontal resolution in the case of the spatial resolution.

Properties of Vision and Temporal Resolution

One of the properties of human vision is that it is acutely sensitive to whether or not an image changes in the time dimension. With respect to the movement of an object, human vision also responds keenly to changes in the speed of movement and to a movement that is different from what is predicted. Therefore, in a moving image of a bouncing ball, as shown in FIG. 1, if the sampling in the time dimension is cut in half and every frame is displayed twice, repeated stopping and starting are perceived, and a choppy movement that lacks smoothness is seen.

Furthermore, when the scene is changed, instead of the entire scene being changed instantly, a smoother scene change is accomplished by blending the preceding scene in with the following scene. This phenomenon is more dependent on stationary objects than on moving objects, and the sudden disappearance of a stationary object is thought to create a sense of incongruity.

Properties of Vision and Spatial Resolution

Another of the properties of human vision is that it is more sensitive to spatial resolution in relation to a stationary object than to spatial resolution in relation to anything having to do with movement. This is easy to understand if one thinks of how the design of a wheel is clearly visible when the wheel is stopped, but becomes hard to perceive when the wheel starts to move.

In the case of the turning wheel, the sensitivity of human vision to temporal resolution with regard to a moving object, and its comparative insensitivity to spatial resolution, is thought to operate as follows: The viewer feels no sense of incongruity if the details of the wheel design of the turning wheel are not clearly visible, but the viewer will feel a sense of incongruity if the wheel appears to be stopping and starting even though the details of the wheel design are clearly visible.

Corrective Action of Binocular Vision

When a human being looks at something stereoscopically with both eyes, even in a state in which the information that is acquired by one eye is insufficient, the information is complemented by information that is acquired by the other eye, thus making stereoscopic vision possible. For example, in a case where the visual acuity of one eye is inferior, even if the image that that eye sees is blurry, binocular stereoscopic vision makes it possible to see a stereoscopic image by using the information from the other eye, and the blurriness can appear to be eliminated to some extent.

Considering the temporal resolution and the spatial resolution in light of the properties of human vision, as described above, it can be understood that it is not desirable to sacrifice the resolution of only one of the time dimension, the left-right direction, and the top-bottom direction as a trade-off, and that it is preferable to conceive of a method for optimally controlling the temporal and spatial resolutions by taking the properties of human vision into account.

It is in consideration of this point of view that the present embodiment provides a method, a system, and a device that transmit a plurality of moving images, particularly binocular stereoscopic moving images, and that, by taking the properties of human vision into account, make it possible to control the temporal and spatial resolutions better than can be done by a method that transmits the binocular stereoscopic moving images by cutting the resolution in half for only one of the time dimension, the left-right direction, and the top-bottom direction.

Figure 5:
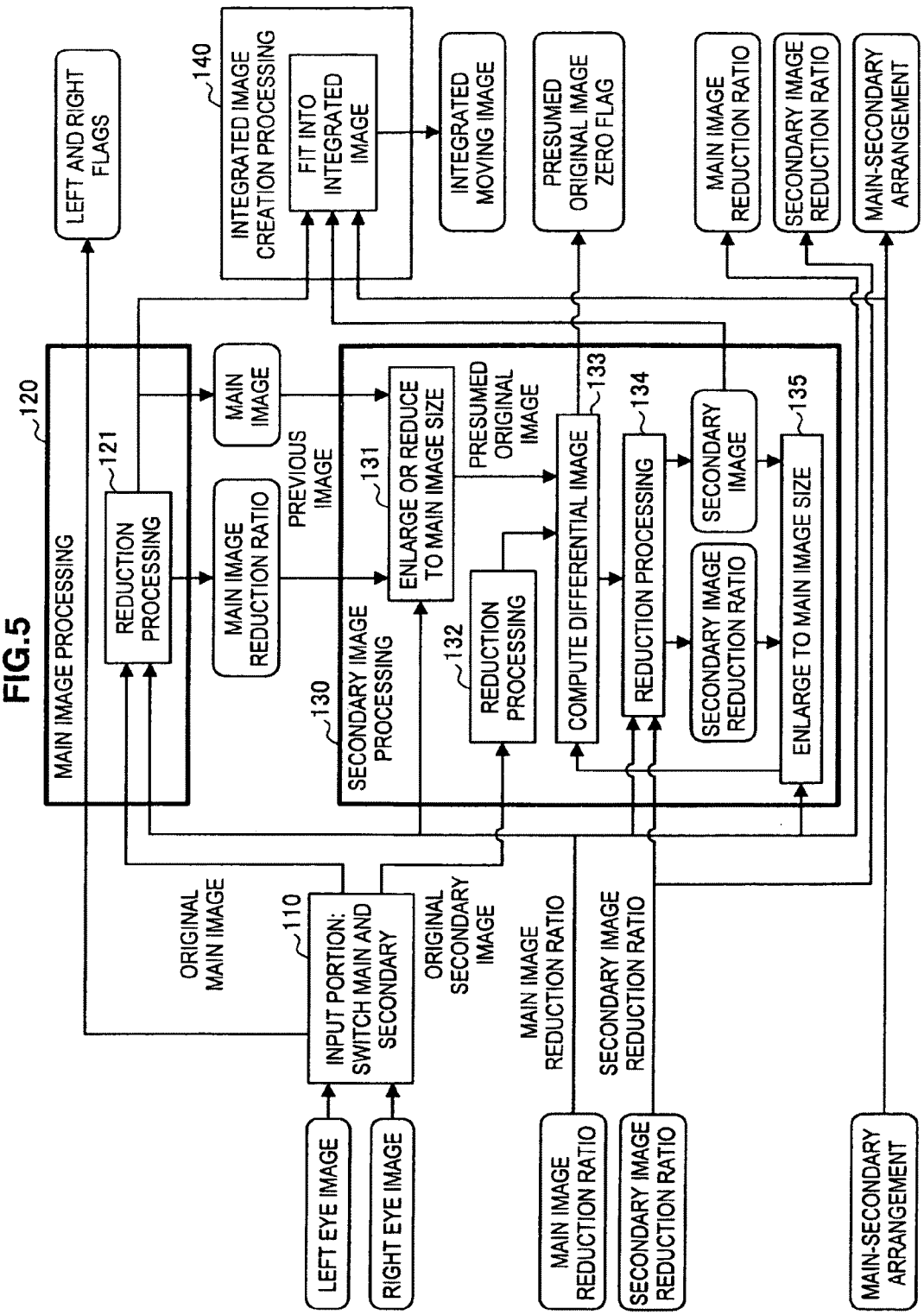
FIG. 5 is a schematic figure that shows processing blocks of a transmission device according to a first embodiment.

First, the basic form of the present embodiment will be described. FIG. 5 is a schematic figure that shows processing blocks of a transmission device 100 according to the first embodiment. Transmission side processing in the present embodiment uses as its inputs a left eye image, a right eye image, a main image reduction ratio, a secondary image reduction ratio, and main-secondary arrangement information, which are shown on the left side of FIG. 5, and uses as its outputs left and right flags, an integrated image, the main image reduction ratio, the secondary image reduction ratio, the main-secondary arrangement information, and a presumed original image zero flag.

The left eye image and the right eye image are moving images that can be viewed stereoscopically by looking at them simultaneously with the respective eyes. The main image and secondary image reduction ratios are related to the arrangement of the main image and the secondary image and indicate the extents to which the main image and the secondary image are reduced in the integrated image in relation to the image sizes of the left eye moving image and the right eye moving image (which are called the original image sizes).

In the present embodiment, it is not necessary to limit the number of the source moving images to two, but initially, a case will be explained in which a binocular stereoscopic moving image is input, which is the most effective. In the case of a binocular stereoscopic moving image, the source images are the moving images for the left eye and the right eye, and they will hereinafter be called the left eye source image and the right eye source image, because those terms are easier to understand than the terms "first source image" and "second source image".

Figure 2:
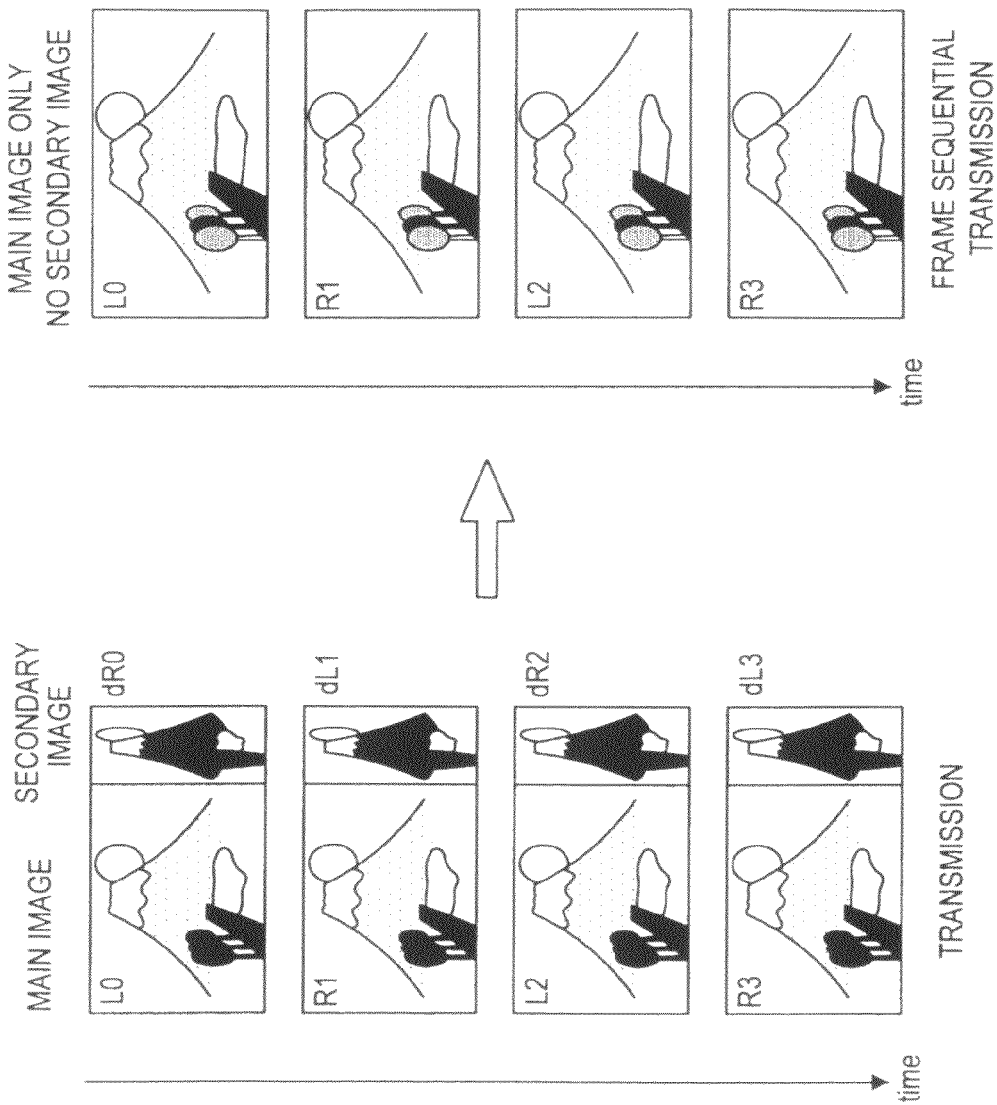
FIG. 2 is a schematic figure that shows a moving image in which main images are arranged alternately for a left eye and a right eye in a case where secondary images have been eliminated.

The left side of FIG. 2 shows how integrated images that respectively include a main image L0 and a secondary image dR0, a main image R1 and a secondary image dL1, a main image L2 and a secondary image dR2, and a main image R3 and a secondary image dL3 are transmitted in a temporal series. As shown in FIG. 2, each of the integrated images is an image in which the main image and the secondary image are combined, and they are the same size as the original images for the left eye and the right eye. The main image is reduced in relation to the original image at a reduction ratio that is prescribed by the main image reduction ratio. The secondary image is reduced in relation to the original image at a reduction ratio that is prescribed by the secondary image reduction ratio. In the present embodiment, the reduction ratios for the main image and the secondary image can be modified within the range of what will fit within the integrated image. For example, in a case where the secondary images are eliminated, as shown on the right side of FIG. 2, the main images L0, R1, L2, and R3 are arranged such that the moving images for the left eye and the right eye alternate, so the transmission method is equivalent to the frame sequential method.

Figure 3:
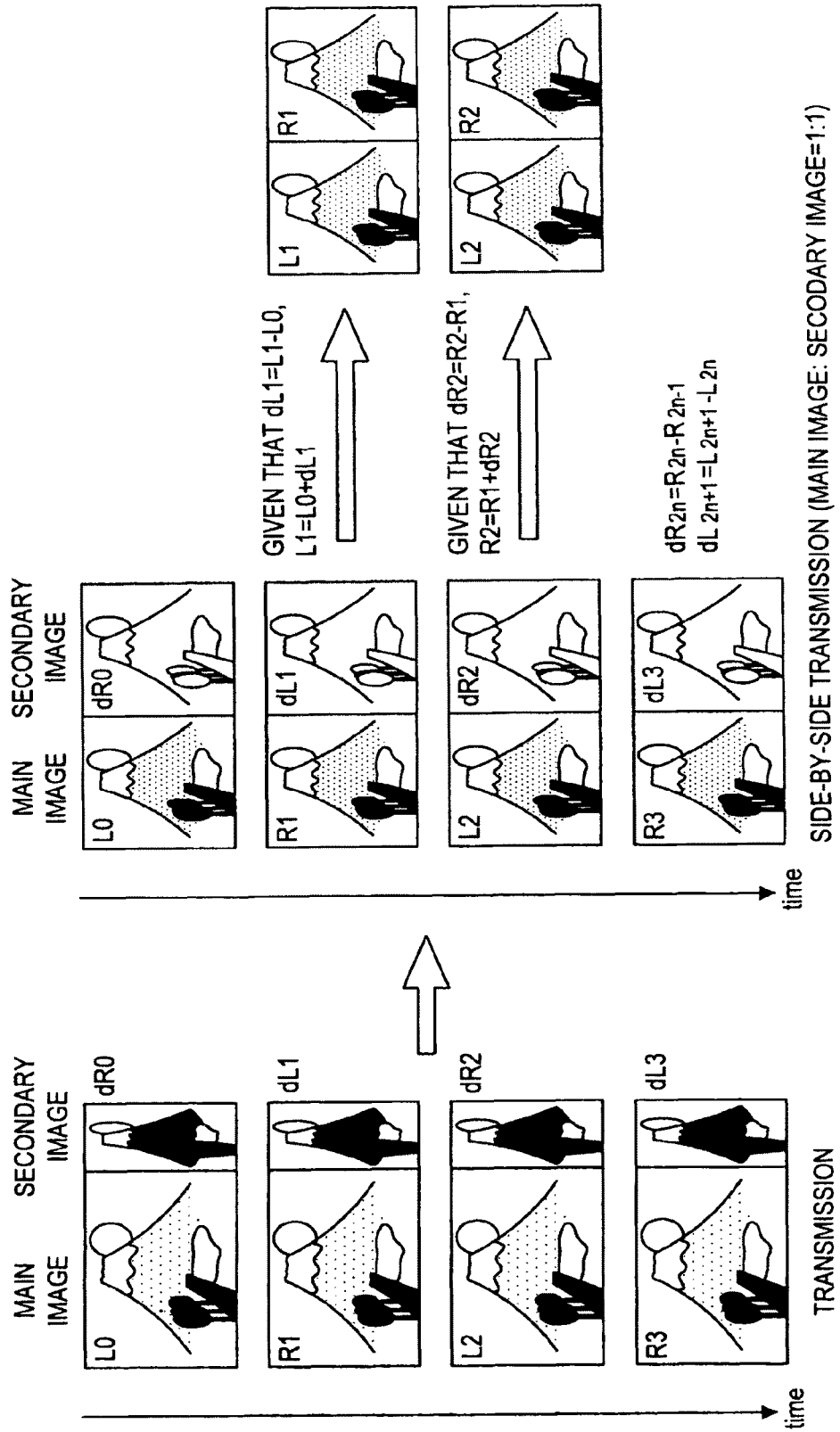
FIG. 3 is a schematic figure that shows a case in which the main images and the secondary images are arranged in the lateral direction.
Figure 4:
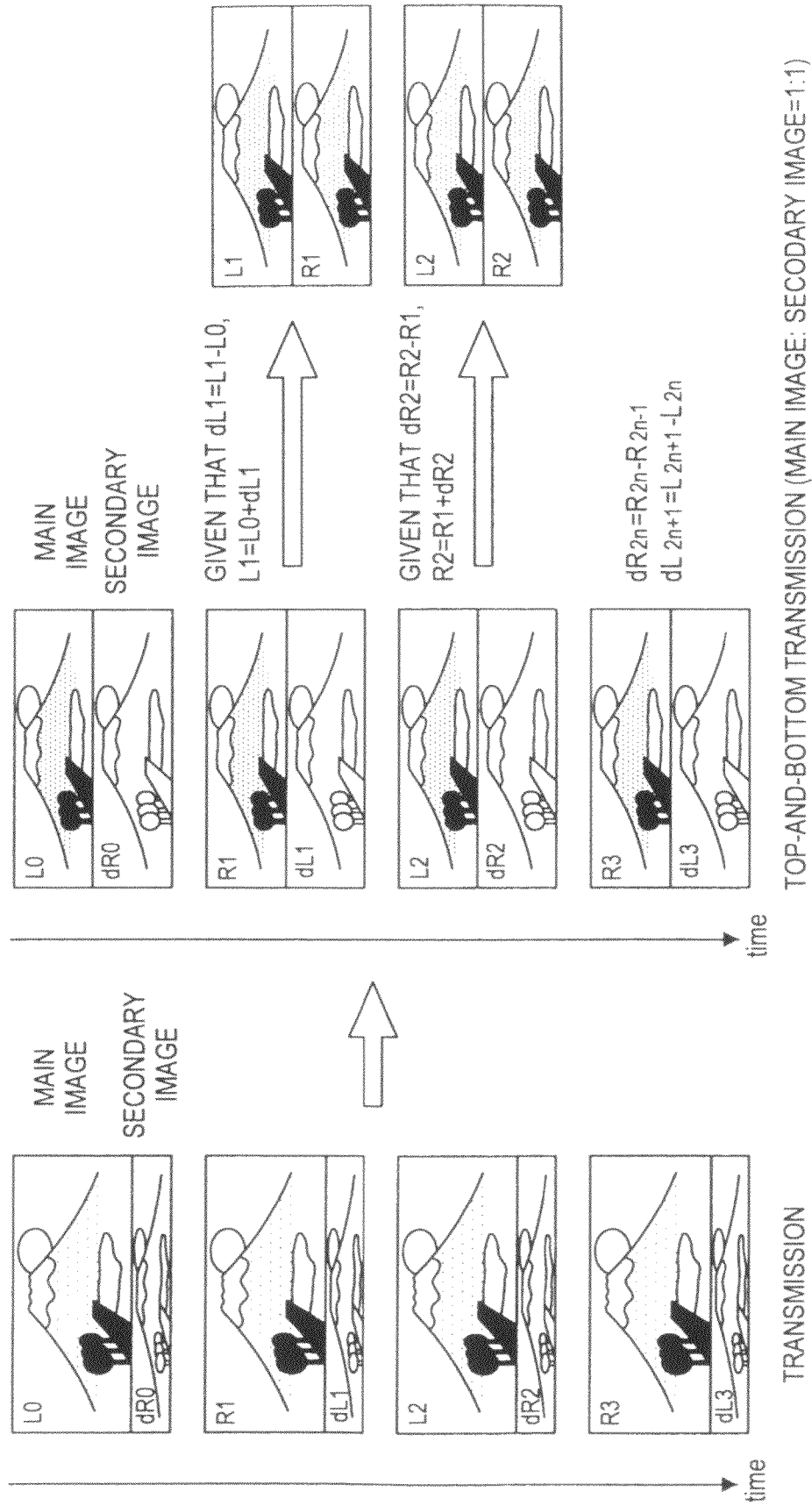
FIG. 4 is a schematic figure that shows a case in which the main images and the secondary images are arranged in the vertical direction.

In the same manner as the drawings on the left side of FIG. 2, the drawings on the left sides of FIGS. 3 and 4 show cases in which the main image reduction ratio and the secondary image reduction ratio are different. The drawings in the middle of FIG. 3 show a case in which the main images and the secondary images have been made the same size and arranged on the left and on the right, so the transmission method is equivalent to the side-by-side method. The drawings in the middle of FIG. 4 show a case in which the main images and the secondary images have been made the same size and arranged at the top and at the bottom, so the transmission method is equivalent to the top-and-bottom method.

In the present embodiment, the integrated images are created by making the main image reduction ratio and the secondary image reduction ratio different, as shown in the drawings on the left sides of FIGS. 2 to 4. Therefore, in the present embodiment, the transmission method is intermediate among the frame sequential method, the side-by-side method, and the top-and-bottom method, which eliminates the restriction that the binocular stereoscopic moving images must be transmitted by cutting in half the resolution for only one of the time dimension, the left-right direction, and the top-bottom direction, which in turn makes it possible to control the temporal and spatial resolutions by setting a transmission method that is close to the frame sequential method, a transmission method that is close to the side-by-side method, or the like, in accordance with the content that is to be transmitted. In the present embodiment, the transmission method is set closer to the frame sequential method as the main image reduction ratio increases, and the transmission method is set closer to one of the side-by-side method and the top-and-bottom method as the main image reduction ratio decreases.

If the current frame is the second frame, as shown in FIG. 3, the secondary image dL1 is the difference between the main image L1 in the current frame and the main image L0 in the preceding frame, and the main image L1 is not transmitted from the transmission side. In other words, the volume of data for the secondary image can be reduced by transmitting the difference dL1 as the left eye image in the second frame, and the integrated image can be created by reducing the secondary image in relation to the main image. In the same manner, the secondary image dR2 is the difference between the main image R2 and the main image R1 in the preceding frame, and the main image R2 is not transmitted from the transmission side. Generalizing this pattern yields the formulas $dR_{2n}=R_{2n}-R_{2n-1}$ and $dL_{2n+1}=L_{2n+1}-L_{2n}$. The case of the top-and-bottom method that is shown in FIG. 4 is similar. Note that $dR_{2n}$ and $dL_{2n+1}$ are called differential images.

In the present embodiment, the introducing of a corrected differential image that is based on the concept of the differential image in the direction of the time axis makes it possible to separate components that change over time from components that do not change over time and to separate the handling of spatial frequencies for stationary objects and moving objects. This takes into account the property of human vision that a person's sensitivity to high-range components of the spatial frequencies is different for stationary objects and moving objects, which means that it is possible to modify the reduction ratios for the main image and the secondary image and to improve the resolution of the main image by excluding the stationary objects from the secondary image the stationary objects, because the human sensitivity to the high-range components is high, such that the secondary image becomes more resistant to deterioration in the high range.

In other words, the data for portions that remain stationary between one frame and the next are not modified. For example, in the frame L1 and the frame L2, the data for the stationary portions are the same, so only the portions where there is movement are modified. Therefore, the differential image dL1 (L1−L0) is an image that corresponds to the portions where there is movement.

With regard to the secondary images, reduced clarity in the images can be avoided only in the images for which the reduction ratio is increased (only in the secondary images that are made smaller), but separating out the stationary objects improves the resistance to deterioration in the high range, and the high-range properties of the main image are improved, the main image being the image for the eye on the opposite side, which is used in binocular stereoscopic vision to compensate for the missing information.

Furthermore, the alternate switching of the main image and the secondary image in relation to the left eye images and the right eye images, and the including, for the stationary objects within the secondary image, of high-range components from a presumed original image that includes the main images in the forward and rearward directions on the time axis for the same eye, make it possible to acquire image information and make it possible to display the stationary objects at a high resolution.

Using the present embodiment as described above makes it possible to provide a method, a system, and a device that, by taking the properties of human vision into account, transmit binocular stereoscopic moving images with better control of the temporal and spatial resolutions than can be done by the long-used method that transmits the binocular stereoscopic moving images by cutting the resolution in half for only one of the time dimension, the left-right direction, and the top-bottom direction.

Next, the effects of the present invention's processing of a plurality of moving images other than binocular stereoscopic moving images will be explained. One of the features of the present embodiment is that, in a case where binocular stereoscopic moving images are transmitted, the effective use of the complementing action of binocular stereoscopic vision to compensate for missing information and the arranging of the main image and the secondary image in the integrated image are advantageous for moving image compression of the integrated image. However, because each of the source images is processed separately, the processing itself is not restricted to stereoscopic moving image processing and is not restricted to having two moving images as inputs.

Figure 33:
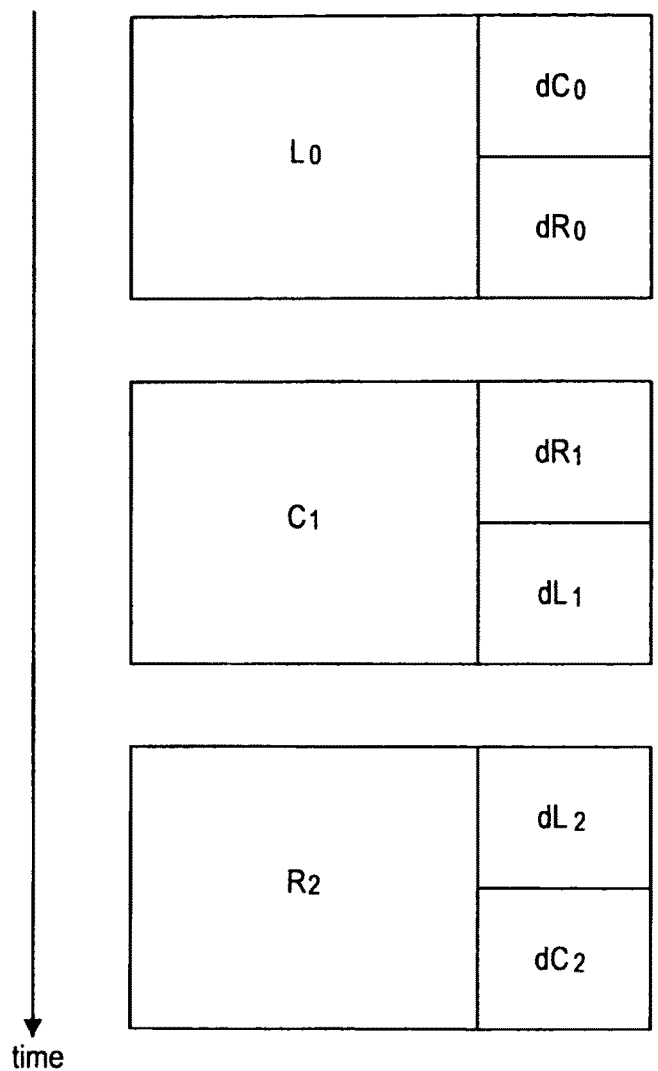
FIG. 33 is a schematic figure that shows a case in which three completely different moving images are transmitted as integrated images.

For example, a case in which three completely different moving images are transmitted as an integrated image, as shown in FIG. 33, can be handled by sequentially changing the source image that serves as the main image. Even in this case, the basing of the secondary image on the concept of the differential image in the direction of the time axis remains unchanged, so the resistance to deterioration in the high range of spatial frequencies can be improved by separating out the stationary objects, and the secondary image can be transmitted with little effect from reduction and enlargement.

There are two source images other than the main image, so in the integrated image, the first source image is arranged as a main image L0, the second source image is arranged as a secondary image dL0, and the third source image is arranged as a secondary image dR0. In this case as well, arranging the images such that the main image has high resolution and the image sizes of the secondary images are reduced makes it possible to provide good spatial resolution for the stationary objects in the main image and to provide good resolution in the time dimension for the moving objects in the secondary images.

According to the present embodiment as described above, it is possible to provide a method, a system, and a device that, by taking the properties of human vision into account, can transmit a plurality of moving images, particularly binocular stereoscopic moving images, with optimal control of the temporal and spatial resolutions.

Figure 26:
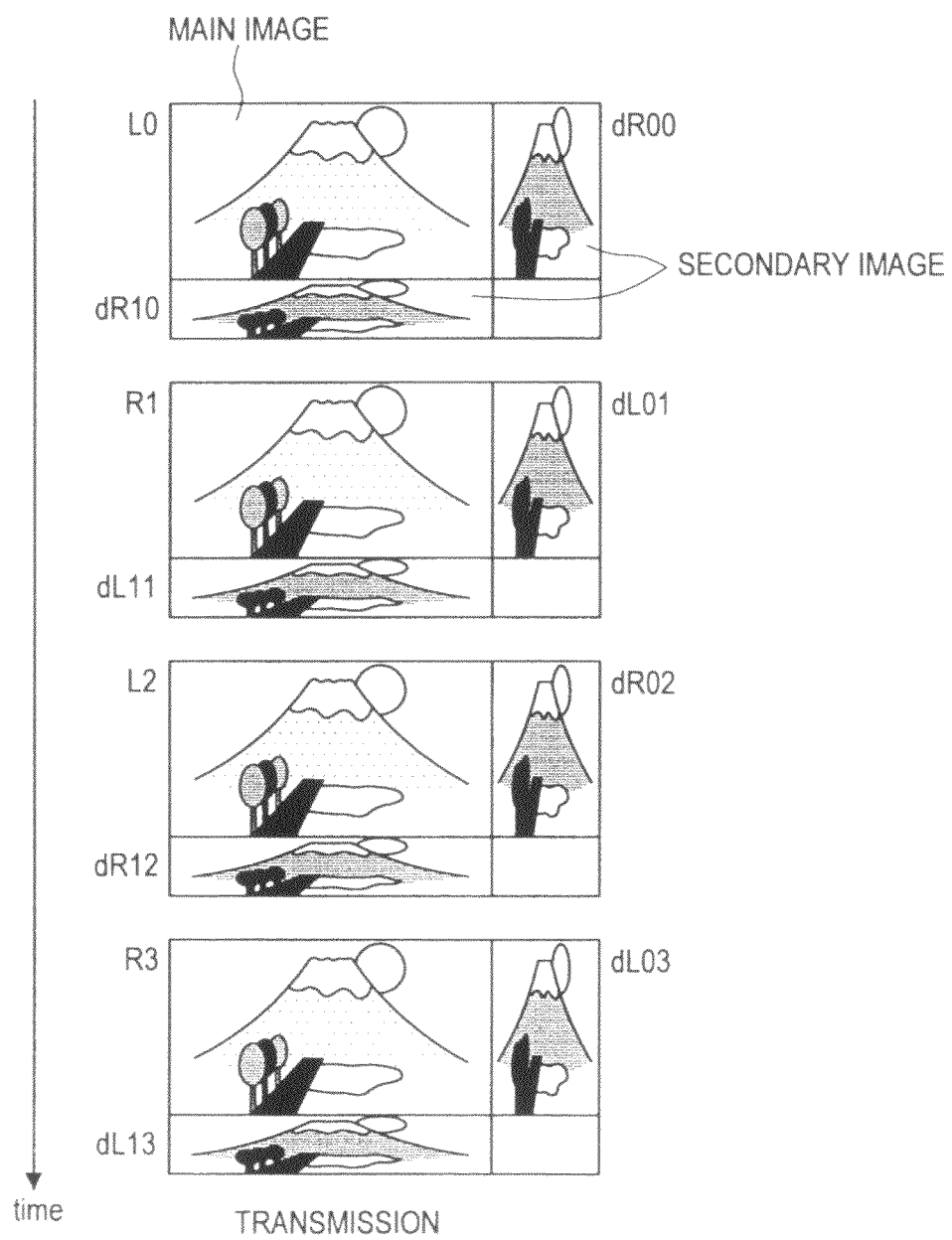
FIG. 26 is a schematic figure that shows integrated images, in each of which secondary images are positioned on the right side and the bottom side of a main image.

The number of secondary images for any one source image is not limited to one, and a plurality of secondary images can be arranged within the integrated image. FIG. 26, for example, shows integrated images in each of which secondary images are arranges on the right side and the bottom side of the main image. In the first frame, for example, L0 is the main image, while dR00 and dR10 are the secondary images. The ratio of the sizes of the main images L0 and R1 to the original image sizes is defined as the main image reduction ratio, and the ratio of the sizes of the secondary images dR00 and dR10 to the original image sizes is defined as the secondary image reduction ratio.

The processing blocks in FIG. 5 are divided into an input portion 110, a main image processing portion 120, a secondary image processing portion 130, and an integrated image creation processing portion 140. The operations of the processing blocks are described by the flowchart of the transmission side processing in the present embodiment in FIG. 7.

In the transmission side processing, there are left and right flags that are used to determine which of the left eye image and right eye image is the main image and which is the secondary image (the initial values of the flags are that the left eye image is the main image and the right eye image is the secondary image). The input portion 110 takes the original left eye image and right eye image that are input and assigns them respectively to the main image processing portion 120 and the secondary image processing portion 130.

In the main image processing portion 120, the original main image (at the original image size) is reduced according to the main image reduction ratio, such that it matches the size of the main image within the integrated image. Because $dR_{2n}=R_{2n}-R_{2n-1}$ and $dL_{2n+1}=L_{2n+1}-L_{2n}$, the main image (one of $R_{2n-1}$ and $L_{2n}$) is saved in order to be used to create the secondary image (one of $R_{2n}$ and $L_{2n+1}$) for the next frame. Next, the left and the right flags that indicate the main image and the secondary image are output, and the main image and the secondary image are arranged within the integrated image, which is then output. If there is still an input image remaining, the settings of the left and right flags are switched, such that the assigning of the original left eye image and right eye image by the input portion 110 to the main image processing portion 120 and the secondary image processing portion 130 will also be switched.

Figure 8:
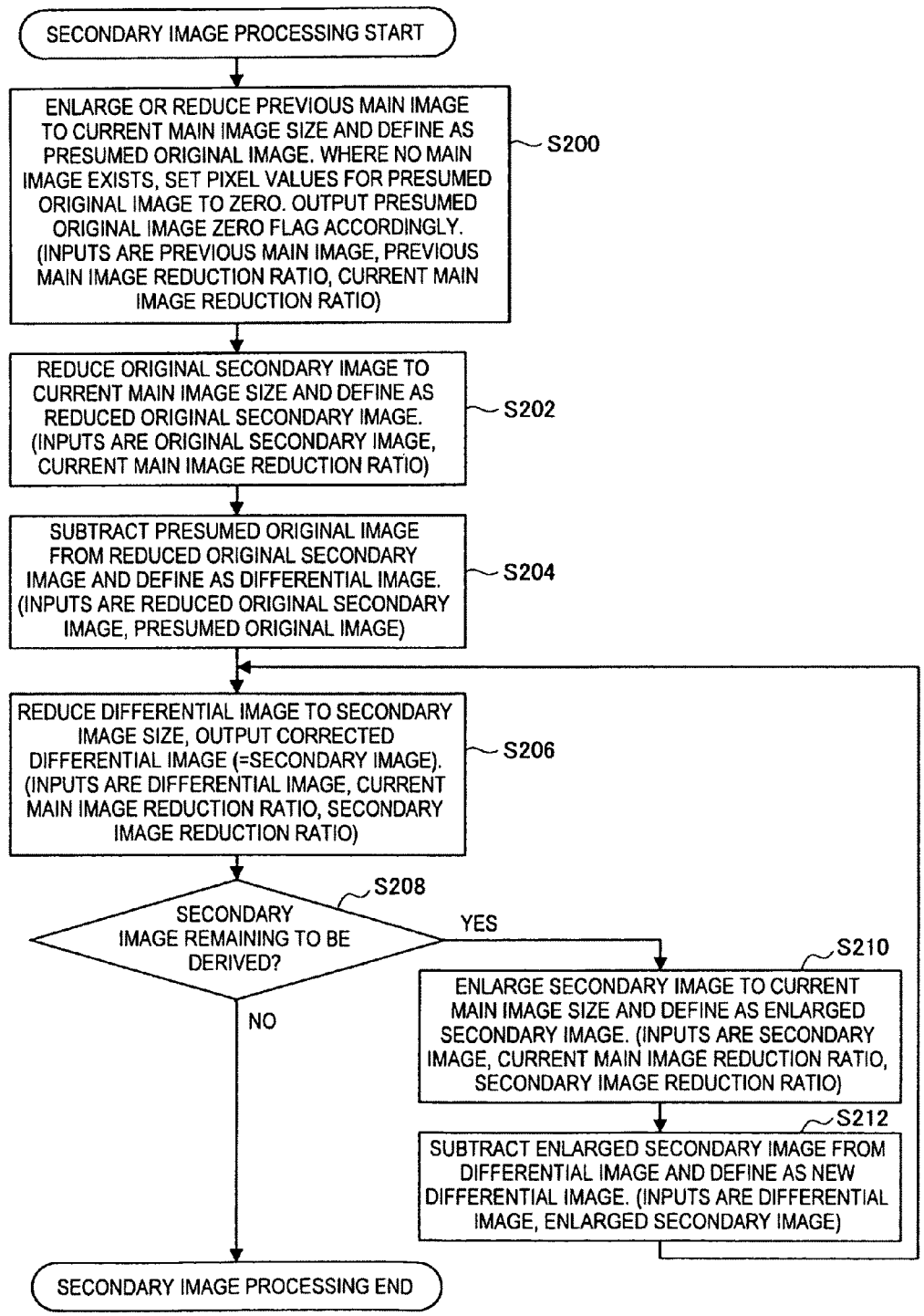
FIG. 8 is a flowchart that shows secondary image processing.

The secondary image processing portion 130 computes the secondary image. The processing by the secondary image processing portion 130 will be explained according to the flowchart of the secondary image processing that is shown in FIG. 8. First, the presumed original image is created. In the present embodiment, the immediately previous main image is one of enlarged and reduced to the size of the current main image and defined as the presumed original image (Step S200). this processing is performed by an enlarging and reducing portion 131 of the secondary image processing portion 130. Note that if the main image size remains unchanged, as shown in FIGS. 3 and 4, the one of the enlarging and reducing of the immediately previous main image is not necessary, so the immediately previous main image (L0, L2, R1, R3, and the like that are shown in FIGS. 3 and 4) is defined as the presumed original image.

However, the first time that the secondary image processing is performed, no immediately previous main image exists, so all of the pixel values for the presumed original image are set to zero. The presumed original image zero flag is also set in order to allow the receiving side to determine whether or not the processing that sets the pixel values for the presumed original image to zero has been performed. In the present embodiment, a determination is made that the pixel values have been set to zero if the presumed original image zero flag is set to 1.

Next, the original secondary image (at the original image size) is reduced to the same size as the presumed original image (Step S202), and the differential image is computed by subtracting the presumed original image from the reduced original secondary image (L1, L3, R0, R2, and the like in FIGS. 3 and 4) (Step S204). The reduction processing is performed by a reduction processing portion 132, and the computation of the differential image is performed by a differential image computation portion 133. In the present embodiment, the differential image is equal to the reduced original secondary image minus the presumed original image, so if the presumed original image is added to the differential image, the original secondary image can be produced at the main image size. On the receiving side, the presumed original image can be computed based on the main image that is extracted from the immediately previous integrated image.

In some cases the secondary image is arranged both on the right side and on the bottom side of the main image, as shown in FIG. 26. In this sort of case, in the present embodiment, the secondary image on the right side of the main image (dL00 in the second frame) is computed first, and the secondary image on the bottom side of the main image (dL01 in the second frame) is computed next. The differential image that is computed first as described above is reduced to the size of the secondary image on the right side and output as a corrected differential image (the secondary image). The processing for the computing for the secondary image on the bottom side is performed if the answer to the question "Is there a secondary image remaining to be derived?" at Step S208 in FIG. 8 is YES. That is, an enlarged secondary image is computed by enlarging to the main image size the secondary image (in the present embodiment, the secondary image on the right side) that was computed prior to the secondary image that is arranged on the bottom side (Step S210), and a new differential image is computed by subtracting the enlarged secondary image from the differential image (Step S212). In other words, the new differential image is equal to the differential image minus the enlarged secondary image. The new differential image is reduced to the size of the secondary image on the bottom side, the secondary image on the bottom side is output, the computation of all of the secondary images that are to be derived is terminated, and the secondary image processing is terminated.

In this case, if it is assumed that the main image in the Kth integrated image is M(K), the secondary image on the right side is dS0(K), and the secondary image on the bottom side is dS1(K), and if it is assumed that the processing that reduces the differential image to the size of the secondary image on the right side is F1, the processing that enlarges the secondary image on the right side to the size of the main image is F2, the processing that reduces the differential image to the size of the secondary image on the bottom side is G1, and the processing that enlarges the secondary image on the bottom side to the size of the main image is G2, then (Secondary image $dS0\ (K)) = F1 \times$ (Differential image) $= F1 \times$ ((Reduced original secondary image) − (Presumed original image))

(New differential image) =

(Differential image) − (Enlarged secondary image) =

(Differential image) − $F2 \times$ (Secondary image) =

(Differential image) − $F2 \times F1 \times$ (Differential image) =

$(1 - F2 \times F1) \times$ (Differential image) =

$(1 - F2 \times F1) \times$ ((Reduced original secondary image) −

(Presumed original image))

Therefore, (Secondary image $dS1\ (K)) =$ $G1 \times$ (New differential image) $= G1 \times (1 - F2 \times F1) \times$ ((Reduced original secondary image) − (Presumed original image))

Because the volume of the data is reduced by the reduction processing, the pre-reduction image cannot be restored even if the enlargement processing is performed after the reduction processing, so it will never happen that all of the pixels in the new differential image are zero. However, in an exceptional case in which the reduction ratio and the enlargement ratio are both 1.0 (that is, a case in which reduction is not done), F2×F1 equals 1, so all of the pixels in the new differential image become zero, and the new differential image ceases to have any meaning. In this case, the secondary image that is adjacent to the main image in the integrated image occupies an area that is the same size as the main image, which is the same arrangement that is used by the side-by-side method and the top-and-bottom method.

The differential image is treated as including positive and negative values, so when the differential image is arranged in the integrated image using the same number of bits as the main image, the precision of the differential image is diminished. In the present embodiment, alternating main images are used that have no problem in terms of their quantized precision, and in relation to these, the precision of the differential image is diminished, so a qualitative problem is not likely to develop through the entire series of moving images, but it is conceivable that non-linear quantization or the like could be used in addition to processing that simply ignores the lowest-order bits.

Note that only in a special case in which there is only one secondary image size and it is the same size as the main image size, an arrangement is made between the transmission side and the receiving side to treat the secondary image, instead of the corrected differential image, as the original secondary image that has been reduced to the secondary image size, thus making it possible to avoid a drop in precision due to an increase in the number of bits for the plus and minus symbols that are generated by the subtraction.

Figure 27:
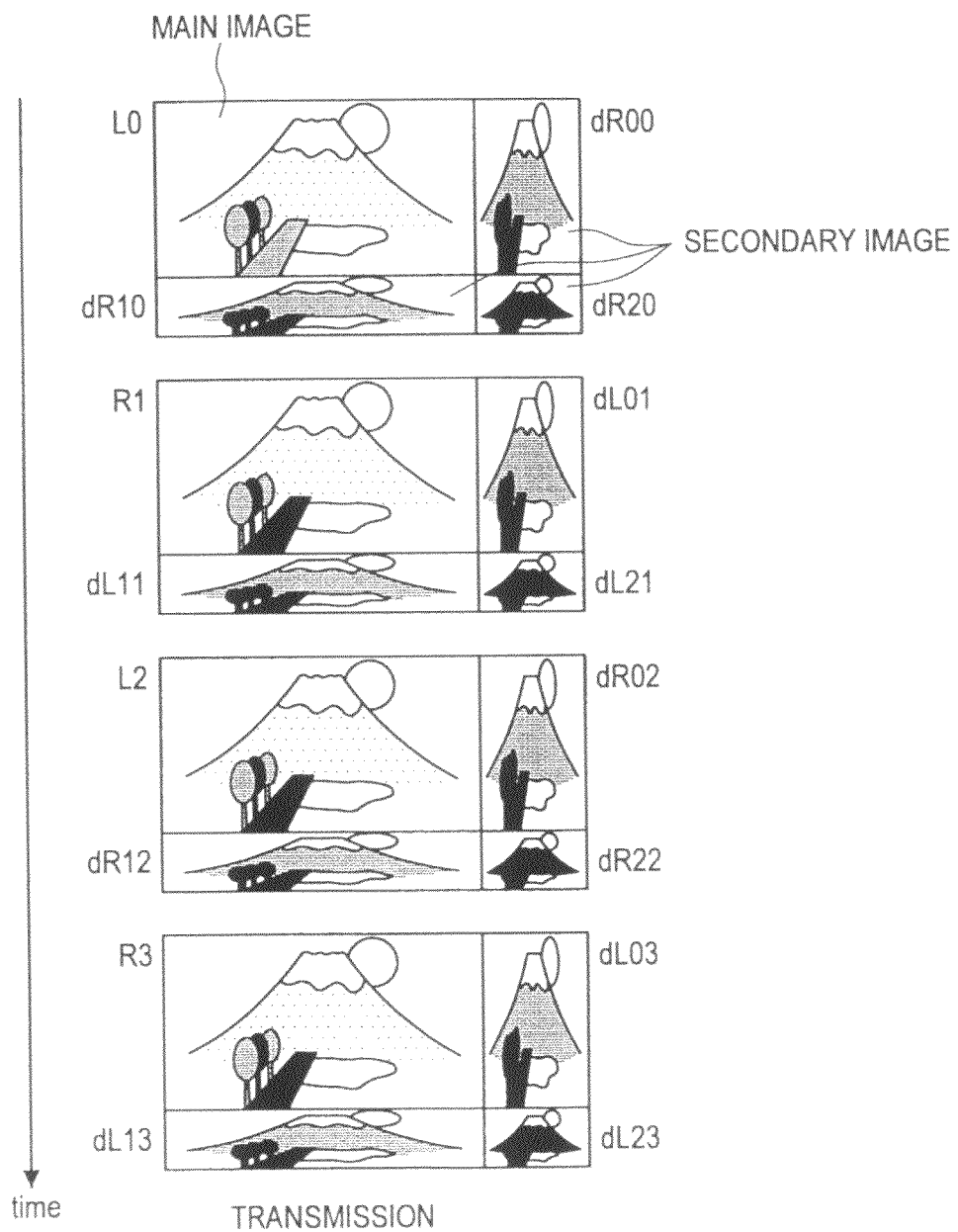
FIG. 27 is a schematic figure that shows a case of integrated images in which the secondary images are positioned in three locations.

A case can also be imagined in which the secondary images are arranged in three locations in the integrated image, as shown in FIG. 27. In this case, if it is assumed that the secondary image at the lower right is dS2(K), that the processing that reduces the differential image to the size of the secondary image at the lower right is H1, and that the processing that enlarges the secondary image at the lower right to the size of the main image is H2, then the fact that the differential image is already expressed as $$\text{Differential image} = (1-F2{\times}F1){\times}((\text{Reduced original secondary image}) - (\text{Presumed original image}))$$

means that the new differential image is expressed as follows:

$$\begin{aligned}
&(\text{New differential image}) = \\
&\quad (\text{Differential image}) - (\text{Enlarged secondary image}) = \\
&\quad (\text{Differential image}) - G2 \times (\text{Secondary image}) = \\
&\quad (\text{Differential image}) - G2 \times G1 \times (\text{Differential image}) = \\
&\quad (1 - G2 \times G1) \times (\text{Differential image}) = (1 - G2 \times G1) \times \\
&\quad (1 - F2 \times F1) \times ((\text{Reduced original secondary image}) - \\
&\quad\quad\quad\quad\quad\quad\quad\quad\quad\quad\quad\quad (\text{Presumed original image}))
\end{aligned}$$

Therefore, $$\begin{aligned}
&(\text{Secondary image } dS2\ (K)) = \\
&H1 \times (\text{New differential image}) = H1 \times (1 - G2 \times G1) \times (1 - F2 \times F1) \times \\
&\quad ((\text{Reduced original secondary image}) - (\text{Presumed original image}))
\end{aligned}$$

When the secondary image is created in this manner, the secondary image is enlarged to the main image size by an enlargement portion 135. The enlarged secondary image is used as the presumed original image (the main image in the immediately previous frame) when the differential image for the next frame is computed.

The integrated image creation processing portion 140 receives the main image as an input from the main image processing portion 120 and receives the secondary image as an input from the secondary image processing portion 130, then creates the integrated image and outputs it to a receiving device 200. In addition, the transmission device 100, as shown in FIG. 5, transmits the left and right flags, the presumed original image zero flag, the main image reduction ratio, the secondary image reduction ratio, and the main-secondary arrangement information to the receiving device 200.

Receiving Side Processing

Figure 6:
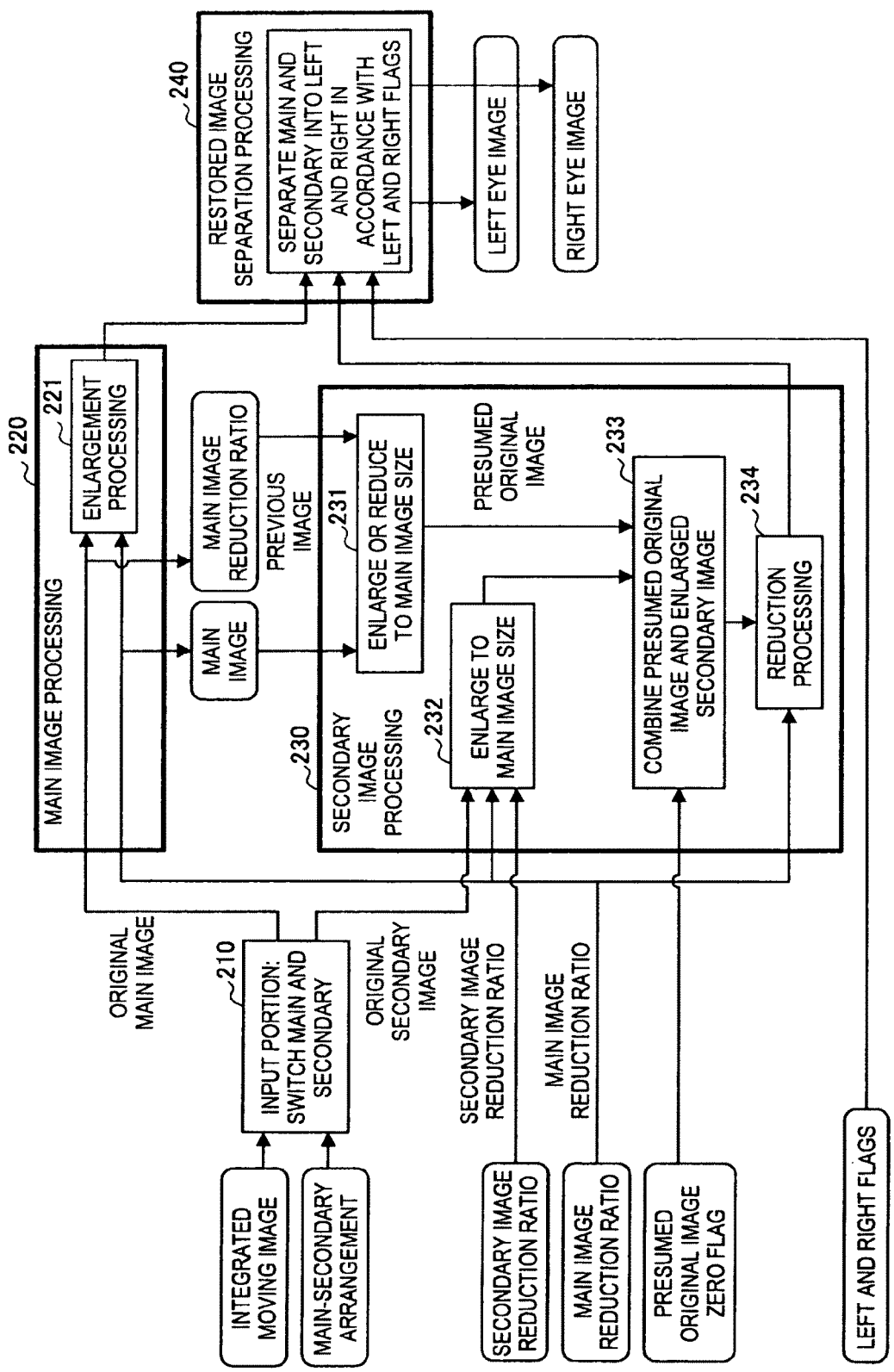
FIG. 6 is a schematic figure that shows processing blocks of a receiving device according to the first embodiment.

Next, receiving side process will be explained. FIG. 6 is a schematic figure that shows processing blocks of the receiving device 200 according to the present embodiment. The receiving side processing in the present embodiment uses as its inputs the integrated image, the main-secondary arrangement information, the main image reduction ratio, the secondary image reduction ratio, the left and right flags, and the presumed original image zero flag, which are shown on the left side of FIG. 6, and outputs the left eye moving image and the right eye moving image. The processing blocks in FIG. 6 are divided into an input portion 210, a main image processing portion 220, a secondary image processing portion 230, and a restored image separation processing portion 240. The receiving side processing is shown by the flowcharts in FIGS. 9 and 10.

Figure 9:
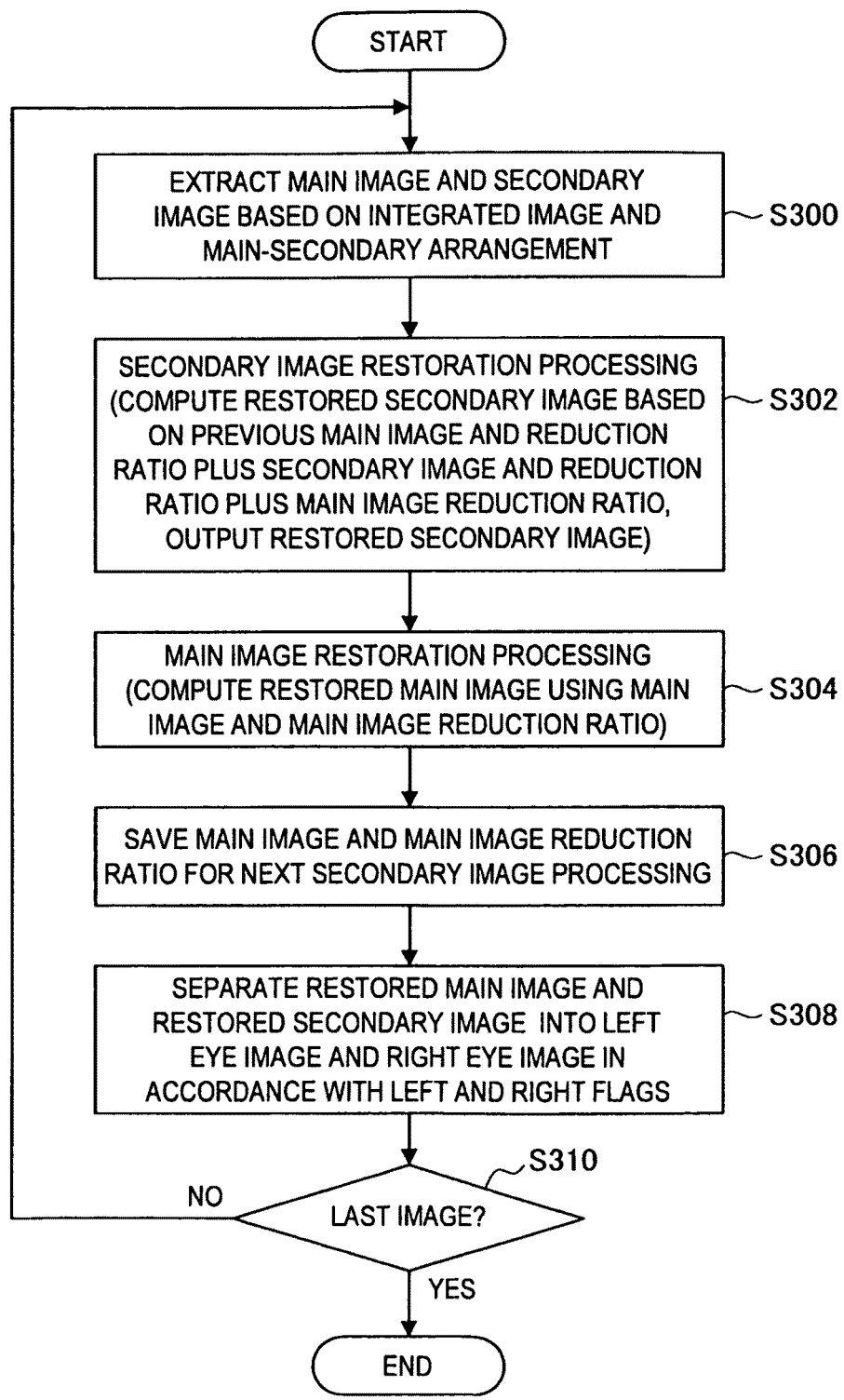
FIG. 9 is a flowchart that shows processing on a receiving side according to the first embodiment.

Starting the explanation with the flowchart in FIG. 9, the input portion 210 in FIG. 6 extracts the main image and the secondary image based on the integrated image and the main-secondary arrangement information that have been input (Step S300). In each of the integrated images in FIGS. 3 and 4, there is only one secondary image. In each of the integrated images in FIG. 26, there are two secondary images, and in each of the integrated images in FIG. 27, there are three secondary images. The main image is input to the main image processing portion 220, and the secondary image is input to the secondary image processing portion 230. Next, secondary image restoration processing that will be described later is performed by the secondary image processing portion 230, and a restored secondary image is computed (Step S302). Thereafter, the main image processing portion 220 enlarges the main image to the original image size, using the main image reduction ratio, and computes a restored main image (Step S304). The enlarging to create the restored main image is performed by an enlargement processing portion 221 of the main image processing portion 220. The restored main image is used in the next secondary image restoration processing, so the main image reduction ratio and the main image are saved until the next secondary image restoration processing is performed (Step S306).

The restored main image and the restored secondary image that have been produced are then separated into the left eye image and the right eye image and output (Step S308). Once the loop from Step S310 to Step S300 has been repeated for all of the integrated images, the receiving side processing is terminated.

Figure 10:
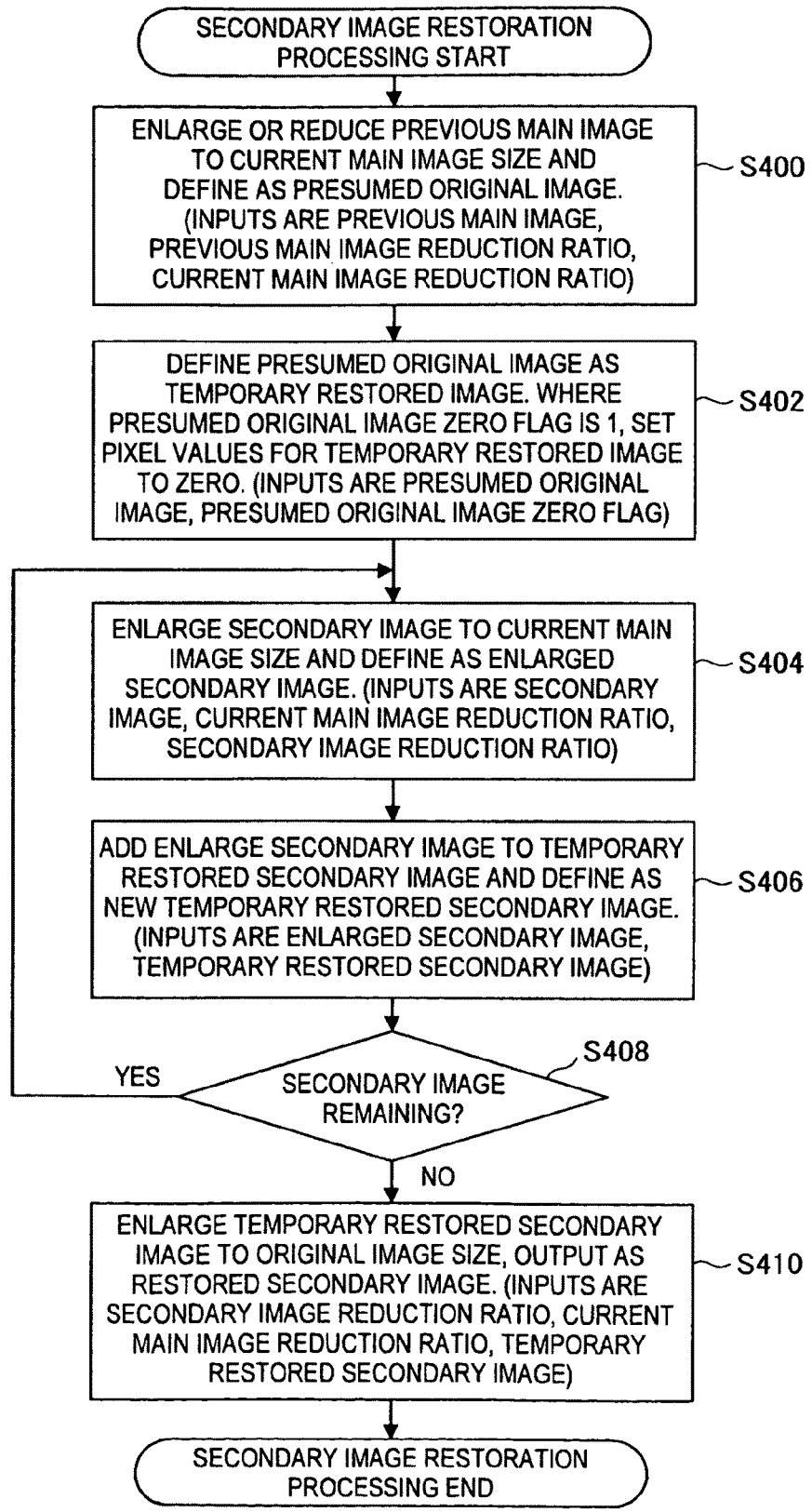
FIG. 10 is a flowchart that shows processing on the receiving side according to the first embodiment.

FIG. 10 is a flowchart that shows the secondary image restoration processing. The secondary image restoration processing is processing that adds up all of the secondary images that have been adjusted to the sizes of the corresponding presumed original images, enlarges them to their original image sizes, and outputs them.

First, the secondary image restoration processing derives the presumed original image by one of enlarging and reducing the immediately previous main image to the current main image size, using the main image reduction ratios for the immediately previous main image and the current image (Step S400). Note that if the size of the main image has not been changed, as shown in FIGS. 3 and 4, the step of one of enlarging and reducing is not necessary, and the immediately previous main image is defined as the presumed original image. This processing is based on an arrangement that is made between the transmission side and the receiving side in the present embodiment to define the immediately previous main image as the presumed original image, and the processing is performed using the same presumed original image on both the transmission side and the receiving side. However, in a case where the presumed original image zero flag has been set to 1, the transmission side processing computes the secondary image with all of the pixel values for the presumed original image set to zero, so the pixel values for the presumed original image are all set to zero.

Next, the presumed original image is defined as a temporary restored image (Step S402), and each of the secondary images is enlarged to the current main image size (Step S404) and added to the temporary restored image (Step S406) in order. Once the loop from Step S408 to Step S404 has been completed for all of the secondary images, the temporary restored image is enlarged to the original image size and output as the restored secondary image (Step S410), after which the secondary image restoration processing is terminated.

Taking the integrated images in FIG. 26, for example, in the transmission side processing, if it is assumed that the main image in the Kth integrated image is M(K), the secondary image on the right side is dS0(K), and the secondary image on the bottom side is dS1(K), and if it is assumed that the processing that reduces the differential image to the size of the secondary image on the right side is F1, the processing that enlarges the secondary image on the right side to the size of the main image is F2, the processing that reduces the differential image to the size of the secondary image on the bottom side is G1, and the processing that enlarges the secondary image on the bottom side to the size of the main image is G2, then the temporary restored image in a state in which all of the secondary images have been added in is expressed as follows:

(Temporary restored image) =

(Presumed original image) + $F2 \times$ (Secondary image $dS0\ (K)$) +

$G2 \times$ (Secondary image $dS1\ (K)$) = (Presumed original image) +

$F2 \times F1 \times$ ((Reduced original secondary image) −

(Presumed original image)) +

$G2 \times G1 \times (1 - F2 \times F1) \times$ ((Reduced original secondary image) −

(Presumed original image)) =

(Reduced original secondary image) − $(1 - G2 \times G1) \times$ $(1 - F2 \times F1) \times$ ((Reduced original secondary image) −

(Presumed original image))

The optimum case is where the reduced original secondary image is restored, but the reduction processing is performed in order to bring the resolution into line with that of the integrated image, so except for special cases, the expression $(1-G2 \times G1) \times (1-F2 \times F1)$ will not equal zero. Of course, the expression (Reduced original secondary image)−(Presumed original image) can be restated as the differential image between the current frame and the previous frame, which means that a still image can be restored without any problem.

For FIG. 27, in which the number of the secondary images is greater, the temporary restored image is closer to the reduced original secondary image:

(Temporary restored image) =

(Presumed original image) + $F2 \times$ (Secondary image $dS0\ (K)$) +

$G2 \times$ (Secondary image $dS1\ (K)$) +

$H2 \times$ (Secondary image $dS2\ (K)$) = (Presumed original image) +

$F2 \times F1 \times$ ((Reduced original secondary image) −

(Presumed original image)) +

$G2 \times G1 \times (1 - F2 \times F1) \times$ ((Reduced original secondary image) −

(Presumed original image)) + $H2 \times H1 \times (1 - G2 \times G1) \times$ $(1 - F2 \times F1) \times$ ((Reduced original secondary image) −

(Presumed original image)) =

(Reduced original secondary image) −

$(1 - H2 \times H1) \times (1 - G2 \times G1) \times (1 - F2 \times F1) \times$ ((Reduced original secondary image) −

(Presumed original image))

Next, the reduction processing and the enlargement processing will be explained in more concrete terms. For example, in FIG. 26, in a case where the secondary image on the right side is reduced, the size in the vertical dimension is not changed, so a one-dimensional filter is applied in the horizontal direction to the pixels in each row to pare down the number of pixels and output a horizontally reduced image.

The processing treats the entire image as a matrix, and if each pixel is treated as an element of the matrix, a matrix operation can be expressed as follows:

[Horizontally reduced image]=[Original image][F1]

An i-column vector of F1 is a coefficient for a reducing FIR filter for computing the pixels of the i-column of the horizontally reduced image that is output. In other words, it is a vector for computing a representative pixel value for assigning weightings to the area around the pixel in question, and the number of the column vectors serves as the horizontal width of the horizontally reduced image. Therefore, [F1] is not a square matrix, but a matrix in which the number of rows is greater than the number of columns.

Furthermore, in horizontal enlargement processing, the processing that is normally performed can likewise be expressed as a matrix on, as follows:

[Horizontally enlarged image]=[Original image][F2]

In the same manner as for F1, the i-column vector is a coefficient for an enlarging FIR filter for computing the pixels of the i-column of the restored image that is output. The difference is that the matrix has fewer rows than columns.

Using this approach, the processing that enlarges and restores the image after the horizontal reduction is expressed as follows:

[Restored image]=[Original image][F1][F2]

In contrast, in the vertical direction, an i-row vector, not the i-column vector, plays the role of the filter, and the matrix is processed from a different direction, so

[Restored image]=[G2][G1][Original image]

If the temporary restored image for FIG. 26 is computed using these relationships, then

[Secondary image $dS0\ (K)$] =

([Reduced original secondary image] − [Presumed original image])[F1]

[Secondary image $dS1\ (K)$] = [G1]

([Reduced original secondary image] − [Presumed original image])

$(1 - [F1][F2])$

[Temporary restored image] = [Reduced original secondary image] −

$(1 - [G2][G1])$([Reduced original secondary image] − [Presumed original image])$(1 - [F1][F2])$ For FIG. 27, the greater number of secondary images are enlarged and reduced in both the vertical direction and the horizontal direction. If a case where separate filters are used for the vertical direction and the horizontal direction (reducing filters H10, H11; enlarging filters H20, H21) is considered, then

[Secondary image $dS2\ (K)$] = $[H10](1 - [G1][G2])$ ([Reduced original secondary image] − [Presumed original image])

$(1 - [F1][F2])[H11]$

-continued

[Temporary restored image] = [Reduced original secondary image] −

(1 − [G2] [G1])([Reduced original secondary image] −

[Presumed original image])(1 − [F1][F2]) + [H20][H10]

(1 − [G2][G1])([Reduced original secondary image] −

[Presumed original image])(1 − [F1][F2])[H11][H21] =

[Reduced original secondary image] − (1 − [H20][H10])

(1 − [G2][G1])([Reduced original secondary image] −

[Presumed original image])(1 − [F1][F2]) −

(1 − [G2][G1])([Reduced original secondary image] −

[Presumed original image])(1 − [F1][F2])

(1 − [H11][H21]) + (1 − [H20][H10])(1 − [G2][G1])

([Reduced original secondary image] −

[Presumed original image])(1 − [F1][F2])(1 − [H11][H21])

In the present embodiment, the immediately previous main image is used for the presumed original image, and the error component of the temporary restored image is dependent on the portion of the image that changes over time. Because the reduction and enlargement filters that are described above are devised as low-frequency pass filters, the errors that occur in relation to the portion of the image that changes over time, for both FIG. 26 and FIG. 27, occur because a high-frequency pass filter that can be described as a full-range minus low-frequency pass filter replaces the high-frequency components of the portion of the image that changes over time in the immediately previous main image.

As was described earlier, one of the properties of human vision is that it is acutely sensitive to changes in the time dimension, but it is not so sensitive to the high-frequency component in the spatial dimension, so it is thought that a certain amount of error is permissible. However, circumstances should be avoided in which the reduction and enlargement filters give rise to a false outline that does not exist in the immediately previous frame and to wavering of the image in the time dimension.

Once the main image and the secondary image have been restored as described above, the restored image separation processing portion 240 separates the main image and the secondary image into the left eye image and the right eye image in accordance with the left and right flags. The left eye image and the right eye image can thus be produced.

2. Second Embodiment

In the second embodiment, the processing in the first embodiment is simplified. In the first embodiment, most of the secondary image processing is performed with the secondary image at the main image size, and on the transmission side, image processing is performed that reduces the main image from the original image size to the main image size and reduces the secondary image to the secondary image size. After the secondary image is transmitted, it is enlarged from the secondary image size to the main image size on the receiving side, after which the temporary restored image that is produced by the image processing is further enlarged to the original image size and displayed.

Figure 11:
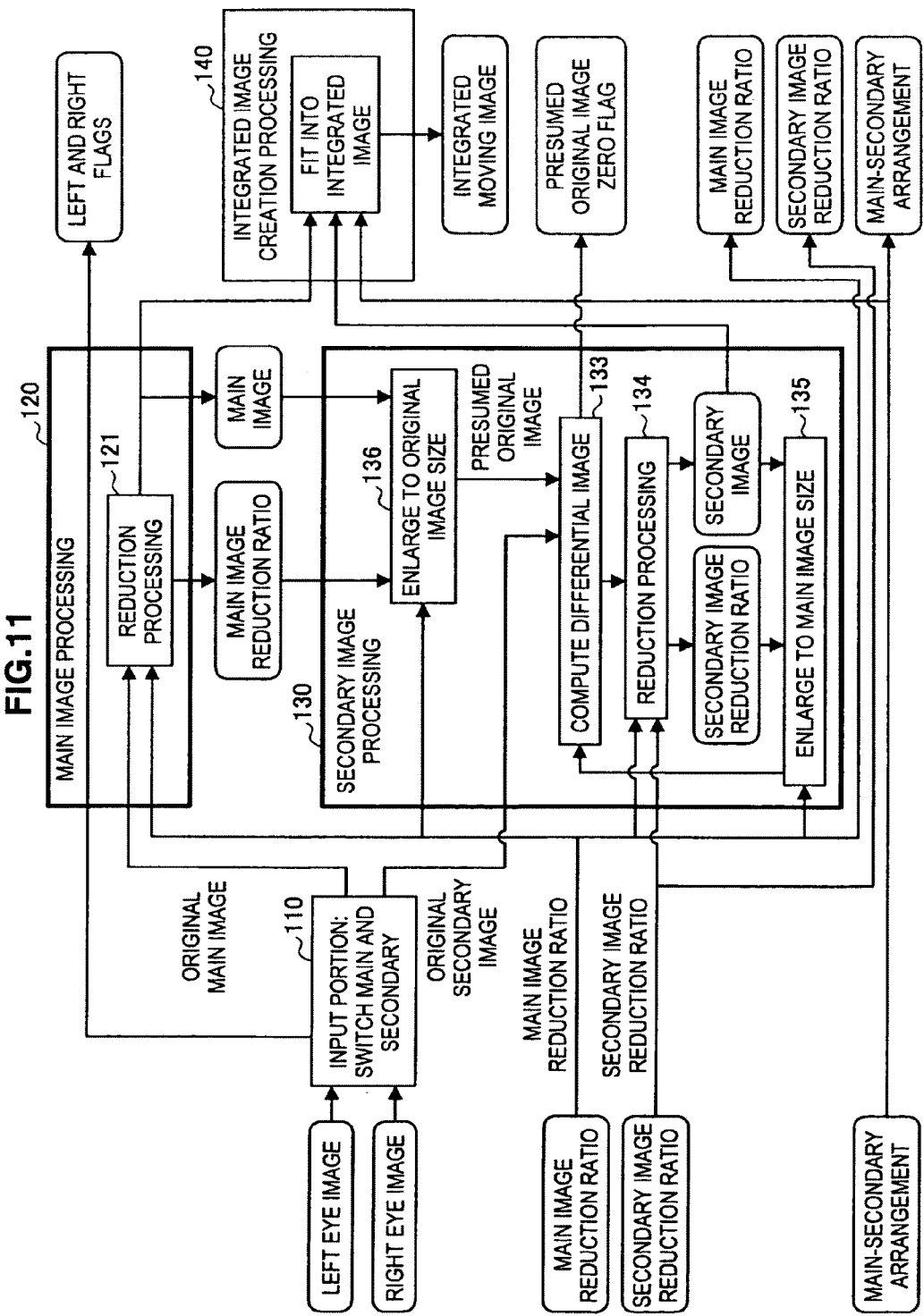
FIG. 11 is a schematic figure that shows processing blocks of a transmission device according to a second embodiment.

In contrast, in the second embodiment, the processing of the secondary image is performed at the original image size instead of at the main image size. FIG. 11 is a schematic figure that shows the processing blocks of the transmission device 100 according to the second embodiment. Unlike in FIG. 5, the reduction processing for the original secondary image is not performed prior to the differential image computation portion 133. Another point of difference from the first embodiment is that the main image that has been saved is enlarged to the original image size, instead of to the current main image size, by an enlargement portion 136.

Figure 13:
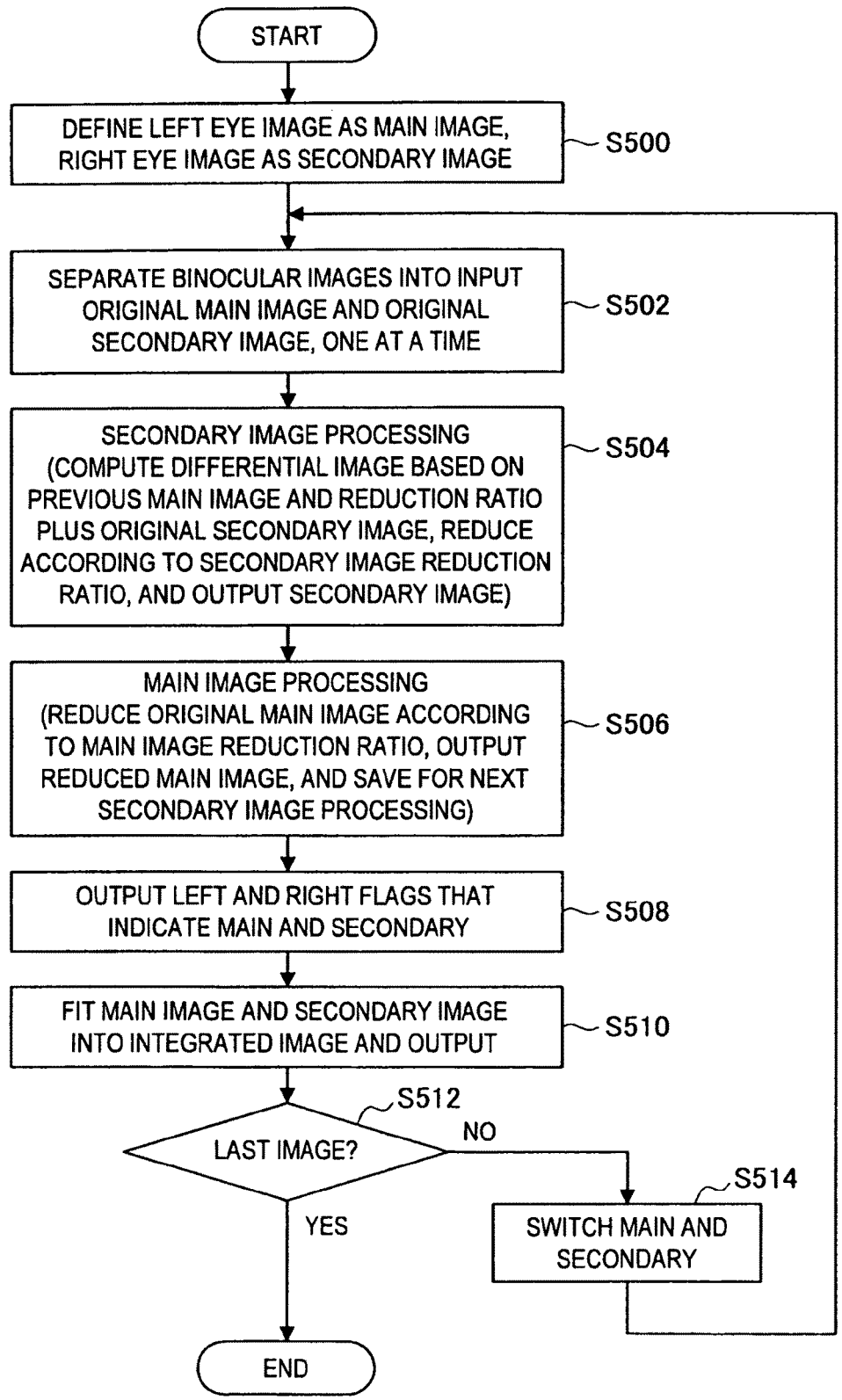
FIG. 13 is a flowchart that shows processing on a transmission side according to the second embodiment.

A flowchart of the transmission side processing in the present embodiment is shown in FIG. 13. The flow of the processing in FIG. 13 is the same as that of the processing in the flowchart in FIG. 7, the difference being in the secondary image processing at Step S504 in FIG. 13 versus Step S104 in FIG. 7. The difference is apparent in the secondary image processing flowchart that is shown in FIG. 14.

Figure 14:
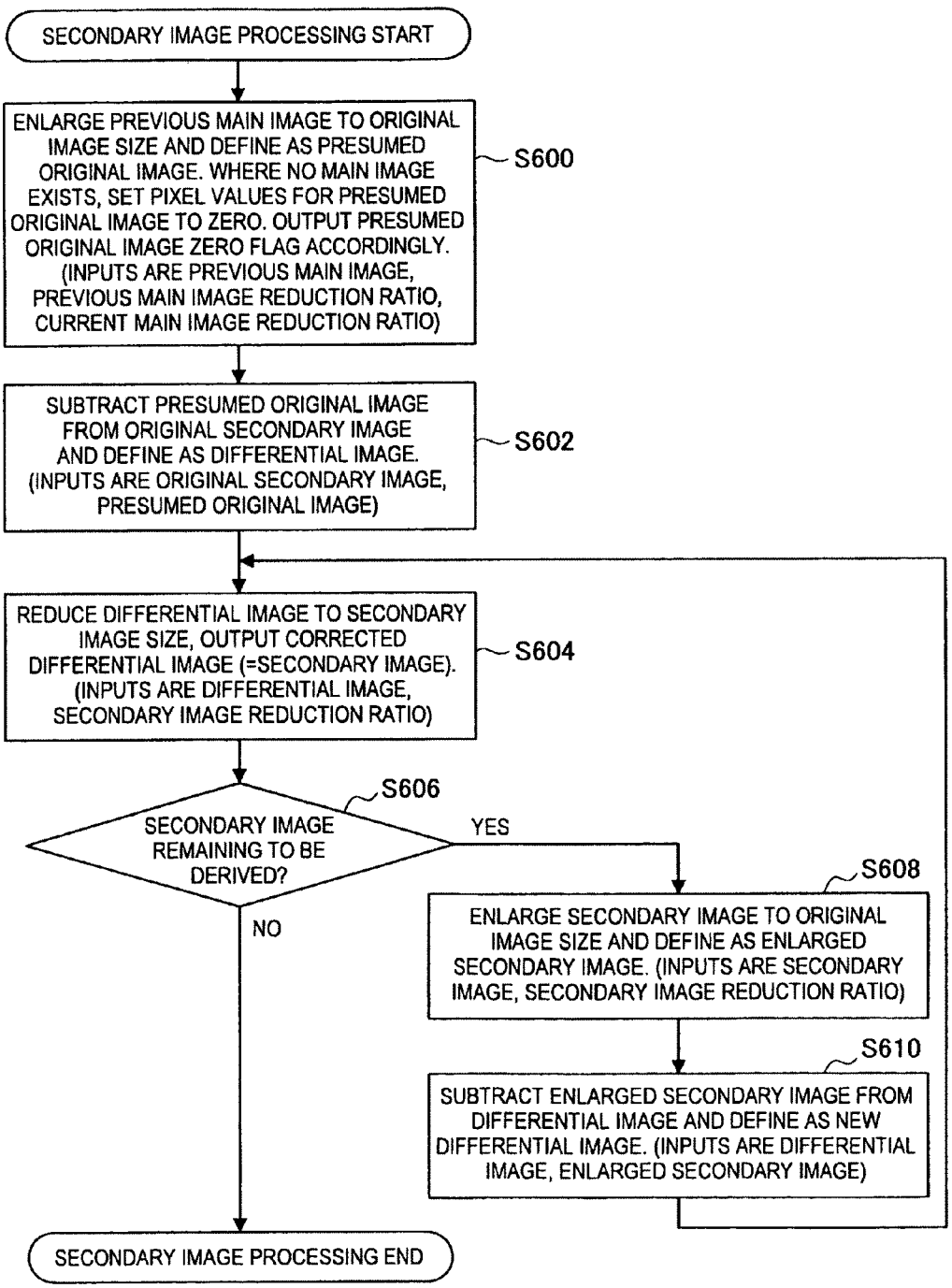
FIG. 14 is a flowchart that shows secondary image processing in FIG. 13.

As shown at the first step in FIG. 14, in the present embodiment, the image that is used as the presumed original image is the immediately previous main image enlarged to the original image size (Step S600). The enlargement processing is performed by the enlargement portion 136. Note that in a case where no immediately previous main image exists, the processing that sets all of the pixel values for the presumed original image to zero and sets the presumed original image zero flag to indicate that all of the pixel values for the presumed original image have been set to zero is the same as the processing in FIG. 8.

Because the original secondary image is the original image size, the differential image is defined as the original secondary image minus the presumed original image (Step S602). Because the differential image equals the original secondary image minus the presumed original image, the original secondary image can be produced by adding the presumed original image to the differential image. Note that on the receiving side, the presumed original image can be computed based on the main image that is extracted from the immediately previous integrated image.

In the present embodiment, if the secondary image on the right side is computed first, and the secondary image on the bottom side is computed next, the differential image that is computed first is reduced to the size of the secondary image on the right side and output as the corrected differential image (the secondary image) (Step S604).

The processing for the computing for the secondary image on the bottom side is performed if the answer to the question "Is there a secondary image remaining to be derived?" at Step S606 in FIG. 14 is "Yes". That is, an enlarged secondary image is computed by enlarging to the original image size the secondary image (in the present embodiment, the secondary image on the right side) that was computed prior to the secondary image that is arranged on the bottom side (Step S608), and a new differential image is computed by subtracting the enlarged secondary image from the differential image (Step S610).

In other words, the new differential image is equal to the differential image minus the enlarged secondary image. Once the new differential image has been reduced to the size of the secondary image on the bottom side, the secondary image on the bottom side has been output, and the computation of all of the secondary images that are to be derived has been terminated, the secondary image processing is terminated.

In this case, if it is assumed that the main image in the Kth integrated image is M(K), the secondary image on the right side is dS0(K), and the secondary image on the bottom side is dS1(K), and if it is assumed that the processing that reduces the differential image to the size of the secondary image on the right side is F1, the processing that enlarges the secondary image on the right side to the original image size is F2, the processing that reduces the differential image to the size of the secondary image on the bottom side is G1, and the processing that enlarges the secondary image on the bottom side to the original image size is G2, then (Secondary image $dS0\ (K)) = F1 \times$ (Differential image) $=$ $\qquad F1 \times ((\text{Original secondary image}) - (\text{Presumed original image}))$ (New differential image) $=$ $\qquad$ (Differential image) $-$ (Enlarged secondary image) $=$ $\qquad$ (Differential image) $- F2 \times$ (Secondary image) $=$ $\qquad$ (Differential image) $- F2 \times F1 \times$ (Differential image) $=$ $\qquad (1 - F2 \times F1) \times$ (Differential image) $=$ $\qquad (1 - F2 \times F1) \times$ (Differential image) $= (1 - F2 \times F1) \times$ $\qquad ((\text{Original secondary image}) - (\text{Presumed original image}))$ Therefore, (Secondary image $dS1\ (K)) =$ $\qquad G1 \times$ (New differential image) $= G1 \times (1 - F2 \times F1) \times$ $\qquad ((\text{Original secondary image}) - (\text{Presumed original image}))$ Because the volume of the data is reduced by the reduction processing, the pre-reduction image cannot be restored even if the enlargement processing is performed after the reduction processing, so it will never happen that all of the pixels in the new differential image are zero.

Figure 12:
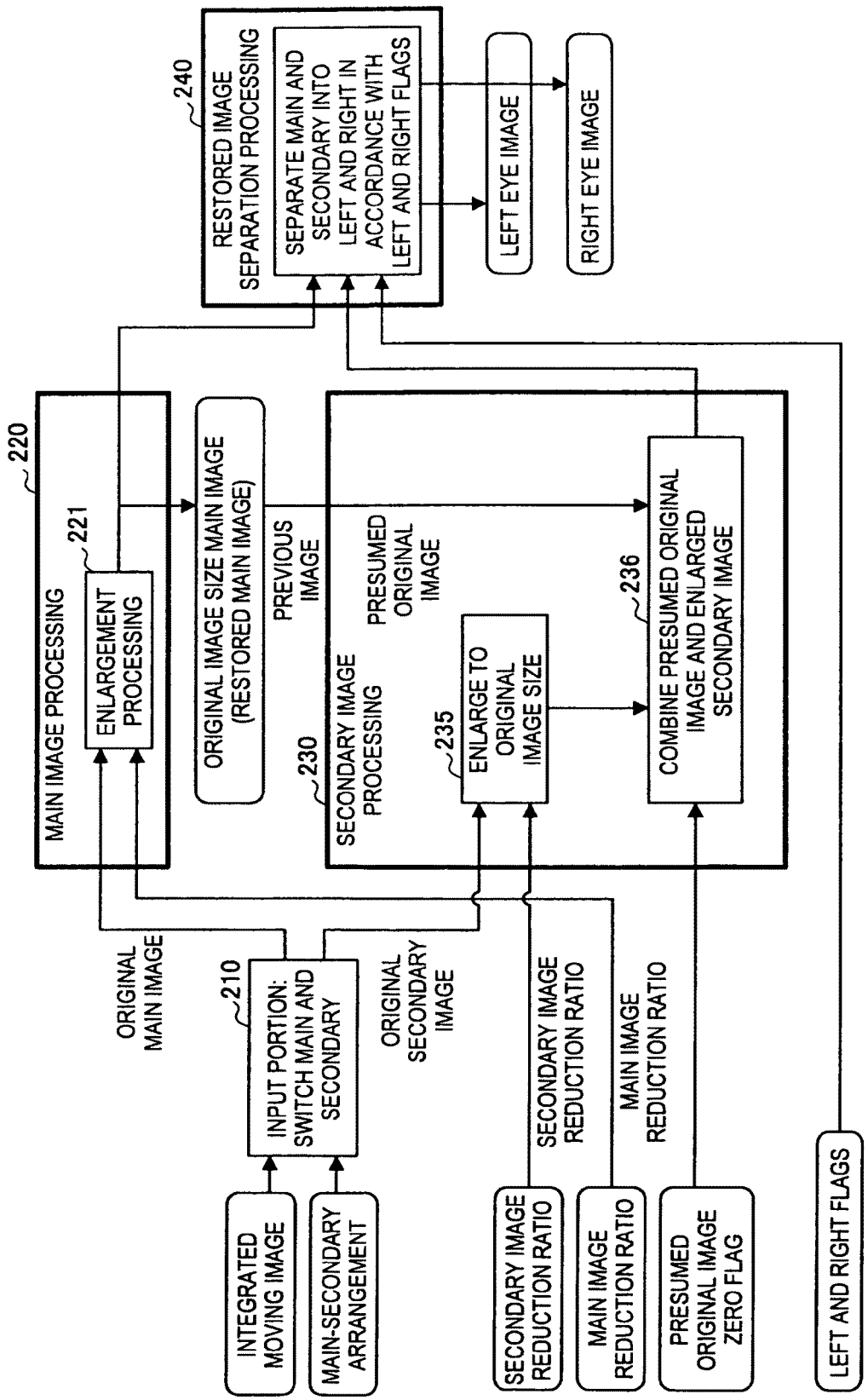
FIG. 12 is a schematic figure that shows processing blocks of a receiving device according to the second embodiment.

For the third secondary image in FIG. 27, if it is assumed that the secondary image at the lower right is dS2(K), that the processing that reduces the differential image to the size of the secondary image at the lower right is H1, and that the processing that enlarges the secondary image at the lower right to the size of the main image is H2, then the fact that the differential image is already expressed as $\qquad$ Differential image$=(1-F2 \times F1) \times ((\text{Original secondary}$
$\qquad$ image$)-(\text{Presumed original image}))$ means that the new differential image is expressed as follows:

(New differential image) $=$ $\qquad$ (Differential image) $-$ (Enlarged secondary image) $=$ $\qquad$ (Differential image) $- G2 \times$ (Secondary image) $=$ $\qquad$ (Differential image) $- G2 \times G1 \times$ (Differential image) $=$ $\qquad (1 - G2 \times G1) \times$ (Differential image) $=$ $\qquad (1 - G2 \times G1) \times (1 - F2 \times F1) \times$ $\qquad ((\text{Original secondary image}) - (\text{Presumed original image}))$ Therefore, (Secondary image $dS2\ (K)) =$ $\qquad H1 \times$ (New differential image) $= H1 \times (1 - G2 \times G1) \times (1 - F2 \times F1) \times$ $\qquad ((\text{Original secondary image}) - (\text{Presumed original image}))$ Next, the processing blocks of the receiving device 200 according to the second embodiment as shown in FIG. 12. The processing in FIG. 6 where the main image and the main image reduction ratio are saved prior to the main image processing has been changed to processing that saves the main image at the original image size after the main image processing. Furthermore, the secondary image processing has been changed such that the immediately previous main image at the original size is used as is for the presumed original image and combined with the enlarged secondary image. After the processing block in which the presumed original image and the enlarged secondary image are combined, the combined presumed original image and the enlarged secondary image are input to the restored image separation processing without any enlargement processing, so the secondary image processing is simpler than in FIG. 6.

Figure 15:
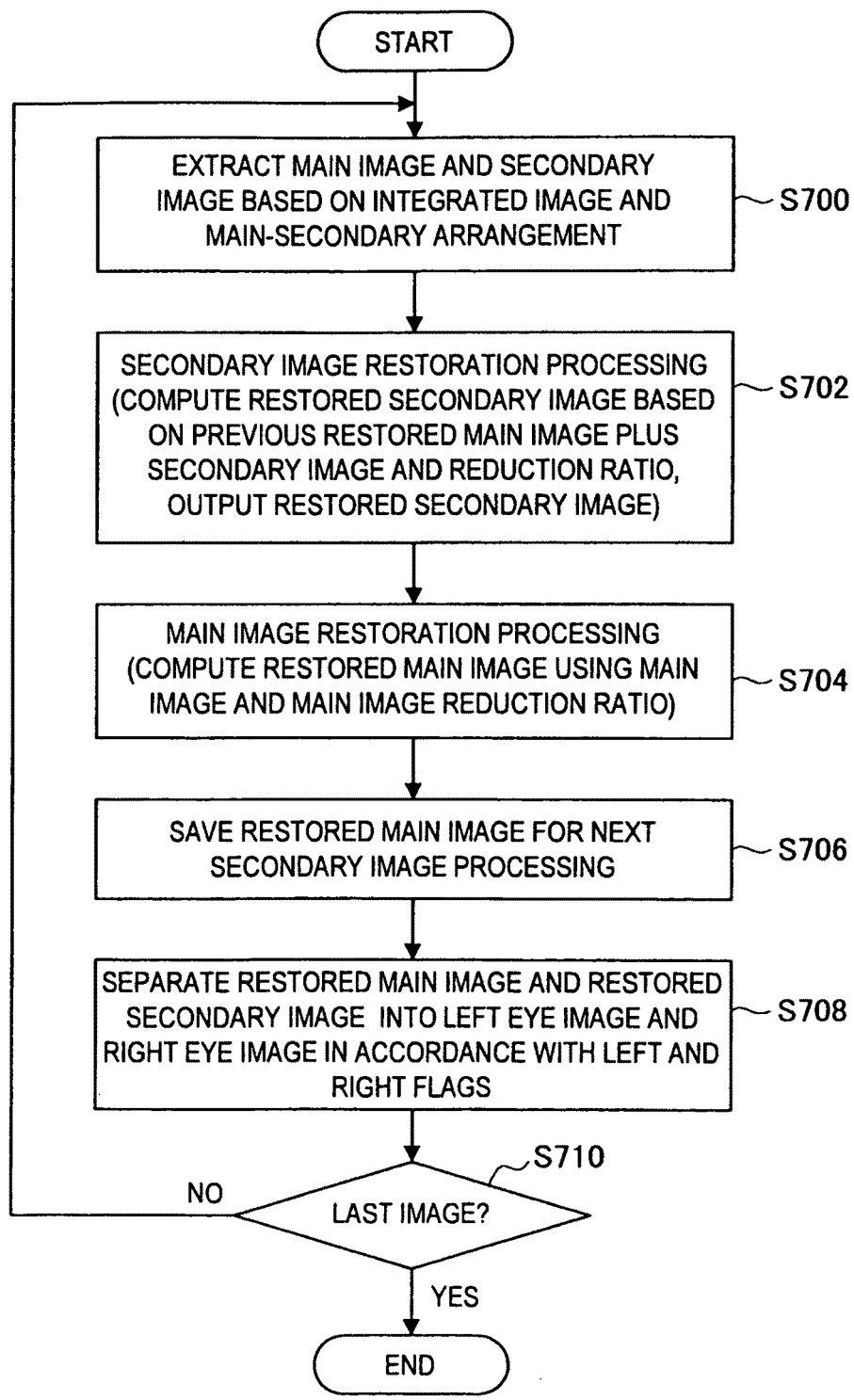
FIG. 15 is a flowchart that shows processing on a receiving side according to the second embodiment.
Figure 16:
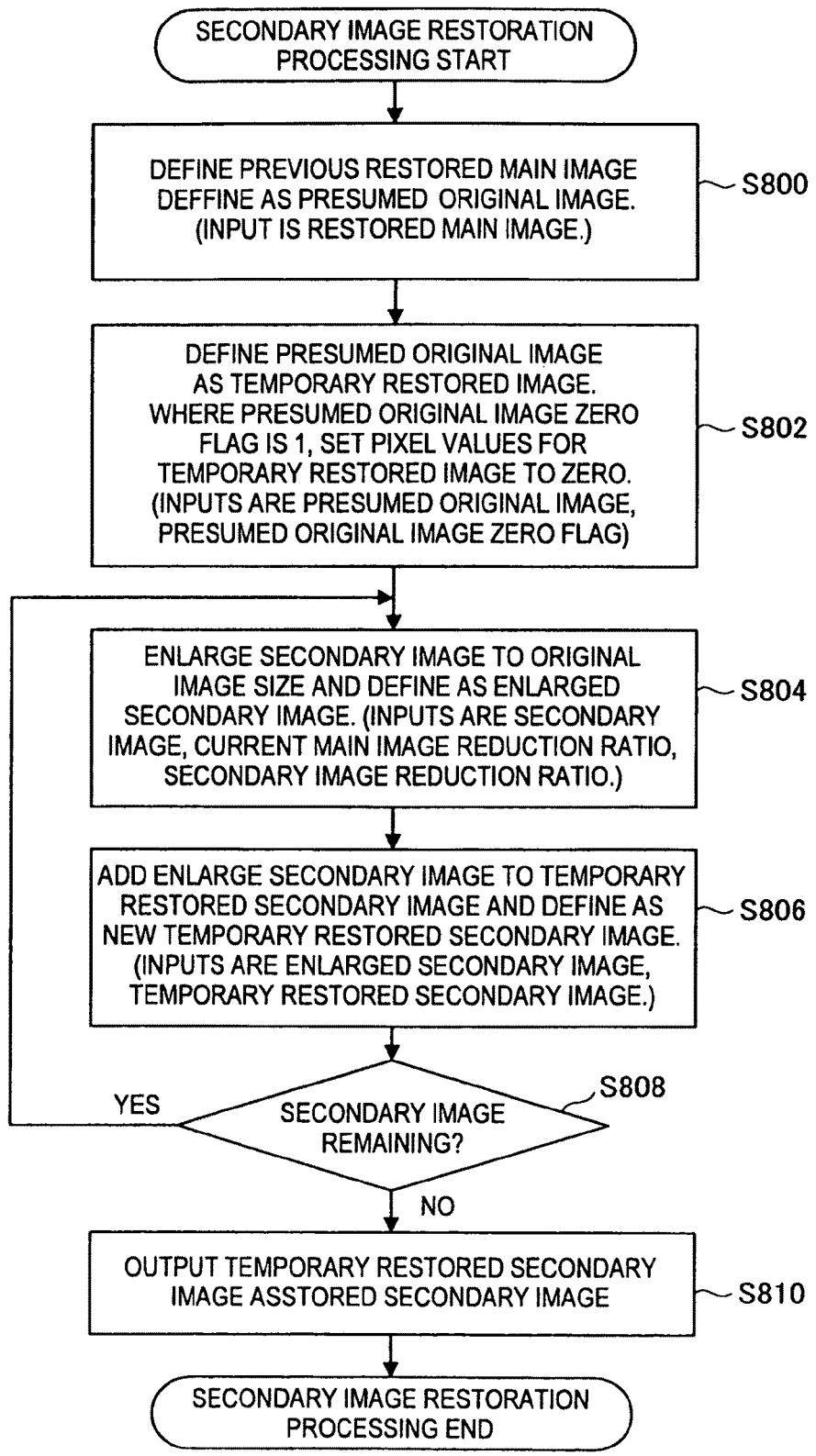
FIG. 16 is a flowchart that shows secondary image restoration processing in FIG. 15.

The receiving side processing is shown by the flowcharts in FIGS. 15 and 16. The flow of the processing in FIG. 15 is the same as that of the processing in the flowchart in FIG. 9, the difference being that the point in the first embodiment where the main image and the main image reduction ratio are saved has been changed such that the restored main image is saved (the difference is between Step S302 and Step S702). In the secondary image restoration processing that is shown in FIG. 16, the points that are different from the processing that is shown in FIG. 10 are that the presumed original image size and the enlarged secondary image size are both the original image size, because the temporary restored image is the original image size (Steps S800 to S804), and that the enlarging to the original image size does not have to be done when the restored secondary image is output (Step S810).

Taking the integrated images in FIG. 26, in the transmission side processing, if it is assumed that the main image in the Kth integrated image is M(K), the secondary image on the right side is dS0(K), and the secondary image on the bottom side is dS1(K), and if it is assumed that the processing that reduces the differential image to the size of the secondary image on the right side is F1, the processing that enlarges the secondary image on the right side to the original image size is F2, the processing that reduces the differential image to the size of the secondary image on the bottom side is G1, and the processing that enlarges the secondary image on the bottom side to the original image size is G2, then the temporary restored image in a state in which all of the secondary images have been added in is expressed as follows:

(Temporary restored image) $=$ $\qquad$ (Presumed original image) $+ F2 \times$ (Secondary image $dS0\ (K)) +$ $\qquad G2 \times$ (Secondary image $dS1\ (K)) =$ $\qquad$ (Presumed original image) $+ F2 \times F1 \times ((\text{Original secondary image}) -$ $\qquad$ (Presumed original image)$) + G2 \times G1 \times (1 - F2 \times F1) \times$ $\qquad ((\text{Original secondary image}) - (\text{Presumed original image})) =$ $\qquad$ (Original secondary image) $- (1 - G2 \times G1) \times (1 - F2 \times F1) \times$ $\qquad ((\text{Original secondary image}) - (\text{Presumed original image}))$ The optimum case is where the original secondary image is restored, but the reduction processing is performed in order to bring the resolution into line with that of the integrated image, so the expression $(1-G2 \times G1) \times (1-F2 \times F1)$ will not equal zero. Of course, the expression (Original secondary image)−(Presumed original image) can be restated as the differential image between the current frame and the previous frame, which means that a still image can be restored without any problem.

For FIG. 27, in which the number of the secondary images is greater, the temporary restored image is closer to the original secondary image:

(Temporary restored image) =

(Presumed original image) + $F2 \times$ (Secondary image $dS0\ (K)$) + $G2 \times$ (Secondary image $dS1\ (K)$) + $H2 \times$ (Secondary image $dS2\ (K)$) =

(Presumed original image) + $F2 \times F1 \times$ ((Original secondary image) −

(Presumed original image)) + $G2 \times G1 \times (1 - F2 \times F1) \times$ ((Original secondary image) − (Presumed original image)) +

$H2 \times H1 \times (1 - G2 \times G1) \times (1 - F2 \times F1) \times$ ((Original secondary image) − (Presumed original image)) =

(Original secondary image) −

$(1 - H2 \times H1) \times (1 - G2 \times G1) \times (1 - F2 \times F1) \times$ ((Original secondary image) − (Presumed original image))

Next, the reduction processing and the enlargement processing will be explained in more concrete terms, in the same manner as for the first embodiment. It has been shown in the first embodiment that the reduction processing and the enlargement processing that compute the output pixels by assigning weightings to pluralities of pixels can be expressed as matrix operations. The processing according to the present embodiment will also be explained in the same manner as a matrix operation. Note that reduction processing and enlargement processing that cannot be expressed as matrix operations can also be used.

In the present embodiment, the secondary image processing is performed with the secondary image at the original image size, so the reduction and enlargement processing is performed in both the vertical and horizontal directions for both the secondary image on the right side and the secondary image on the bottom side. If it is assumed that the reduction processing for the secondary image on the right side is F10, F11, and that the enlargement processing is F20, F21, and if it is assumed that the reduction processing for the secondary image on the bottom side is G10, G11, and that the enlargement processing is G20, G21, then in the secondary image processing and the secondary image restoration processing for FIG. 26,

[Secondary image $dS0\ (K)$] = [$F10$][Differential image 0][$F11$]

However,

[Differential image 0] =

[Original secondary image] − [Presumed original image]

[Secondary image $dS1\ (K)$] = [$G10$][Differential image 1][$G11$]

However,

[Differential image 1] = $(1 - [F20][F10])$[Differential image 0] +

[Differential image 0]$(1 - [F11][F21])$ −

$(1 - [F20][F10])$[Differential image 0]$(1 - [F11][F21])$

[Restored secondary image] = [Original secondary image] +

$(1 - [G20][G10])$[Differential image 1]$(1 - [G11][G21])$ −

[Differential image 1]$(1 - [G11][G21])$ −

$(1 - [G20][G10])$[Differential image 1]

For FIG. 27, with its greater number of secondary images, if a case where the reduction processing is H10, H11, and the enlarging processing is H20, H21 is considered, then

[Secondary image $dS2\ (K)$] = [$H10$][Differential image 2][$H11$]

However,

[Differential image 2] =

[Differential image 1] − [$G20$][$G10$][Differential image 1][$G11$][$G21$] =

$(1 - [G20][G10])$[Differential image 1] +

[Differential image 0]$(1 - [G11][G21])$ −

$(1 - [G20][G10])$[Differential image 1]$(1 - [G11][G21])$

[Restored secondary image] = [Original secondary image] +

$(1 - [H20][H10])$[Differential image 2]$(1 - [H11][H21])$ −

[Differential image 2]$(1 - [H11][H21])$ −

$(1 - [H20][H10])$[Differential image 2]

Figure 28:
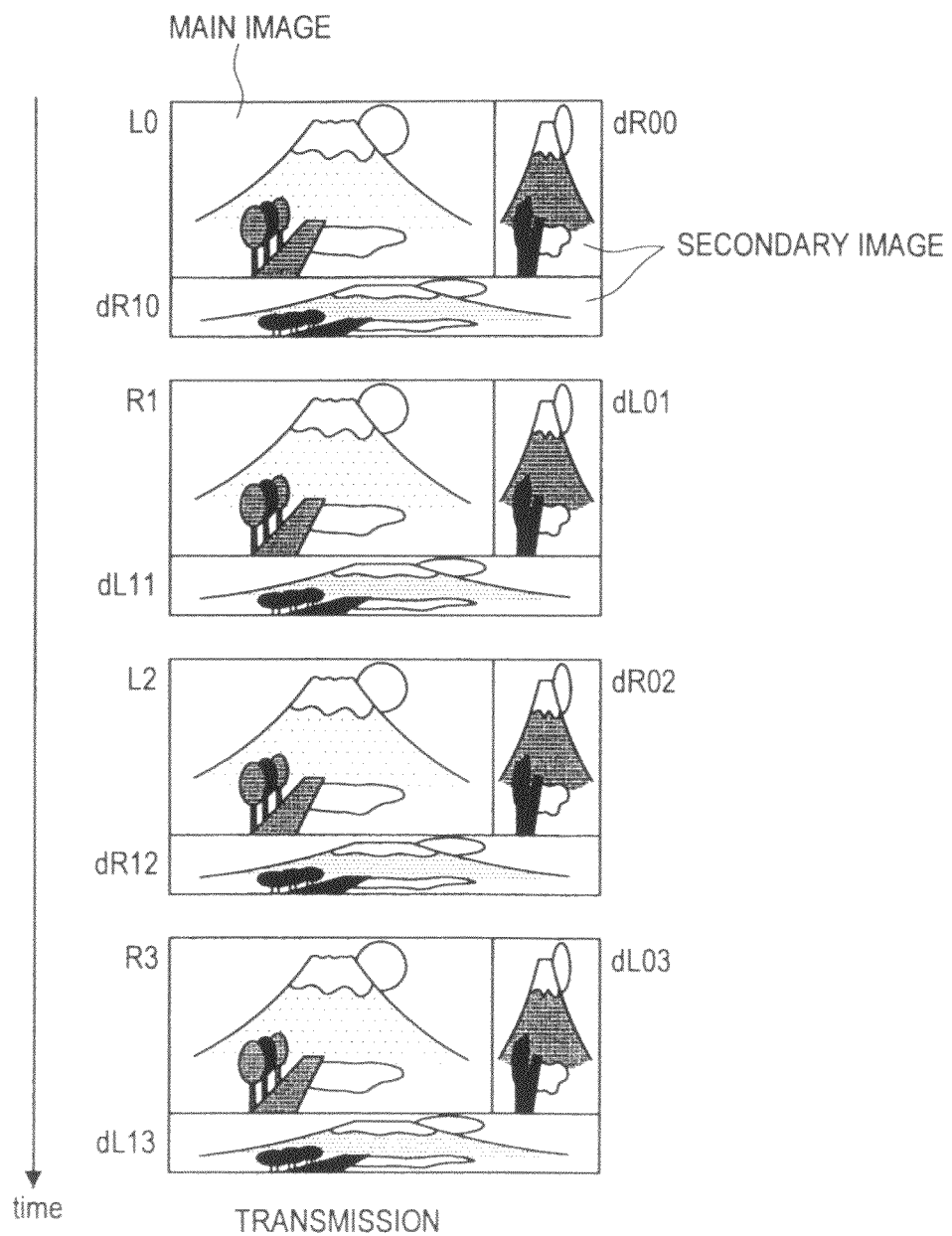
FIG. 28 is a schematic figure that shows a case of integrated images in which the secondary images are positioned in two locations.
Figure 29:
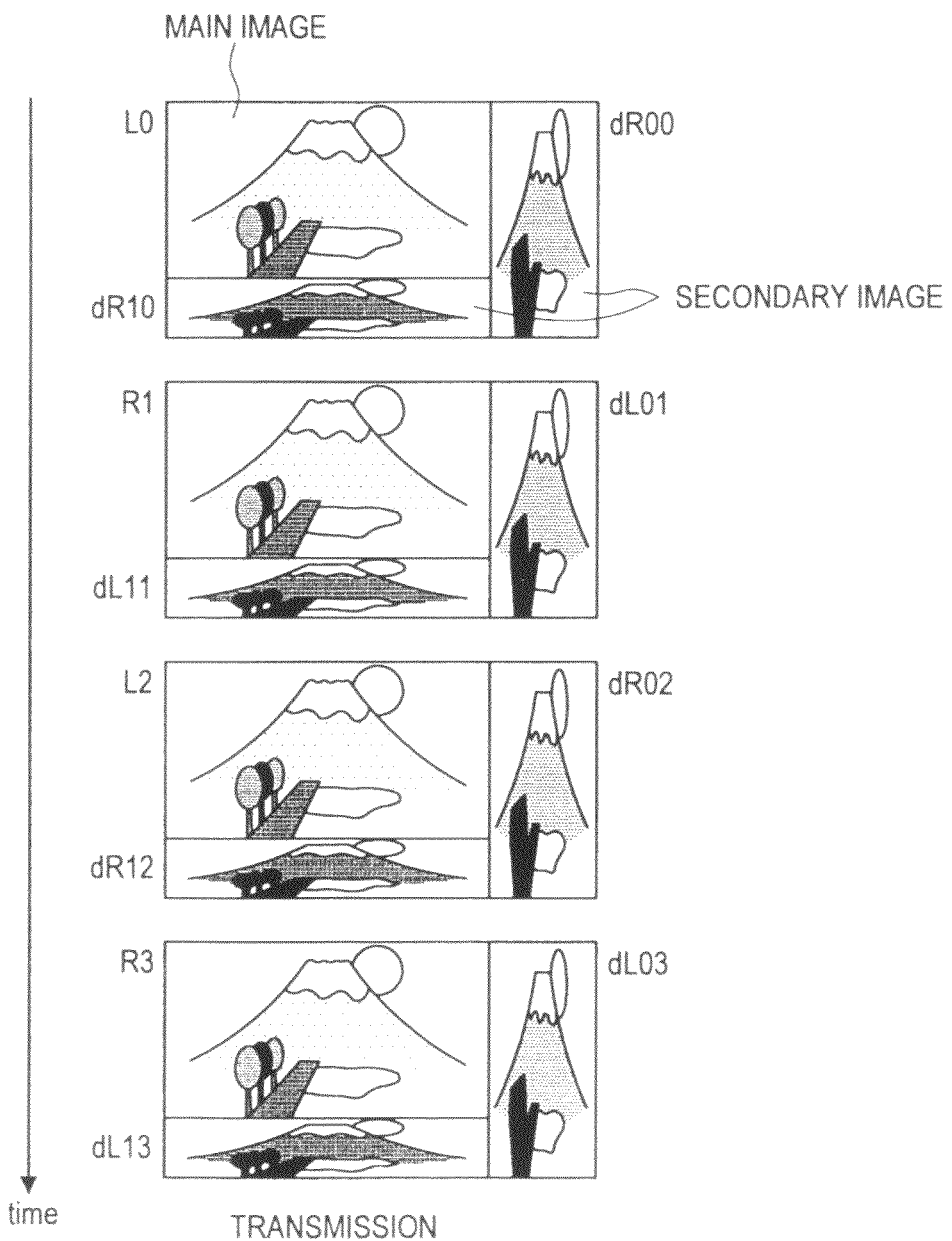
FIG. 29 is a schematic figure that shows a case of integrated images in which the secondary images are positioned in two locations.

In the formulas above, the restored secondary image is thought to come closer to the original secondary image if the number of secondary images increases, but the matrices F, G, and H for the reduction and enlargement processing are actually altered by restrictions on the resolution of the integrated image. The advantage of the case of the three secondary images in FIG. 27 over the cases of the two secondary images in each of FIGS. 28 and 29 therefore varies according to the restrictions on the resolution. Cases can also occur in which a simple main image with one secondary image is preferable. The optimum conditions also vary depending on the nature of the content that is transmitted, so these cases can accordingly be handled flexibly.

If the main-secondary arrangement information, the main image reduction ratio, and the secondary image reduction ratio are transmitted for each integrated image, the main-secondary arrangement can be varied dynamically. It is also possible to limit the number of changes and to transmit only when a change occurs. The main-secondary arrangement, the reduction ratios, and the transmission and receiving times can also be fixed, such that transmission parameters are not included. The filter parameters for the reduction and enlargement processing could also be transmitted along with the main image reduction ratio and the secondary image reduction ratio.

In the present embodiment, the differential image is created at the original image size, so the reduction ratio and the enlargement reduction ratio for F1, F2 will never be 1.0, even if the secondary image sizes and the main image size are the same. Accordingly, it is conceivable both that the transmission side secondary image processing that is shown in FIG. 30 would be used and that the receiving side secondary image processing that is shown in FIG. 31 would be used.

Figure 30:
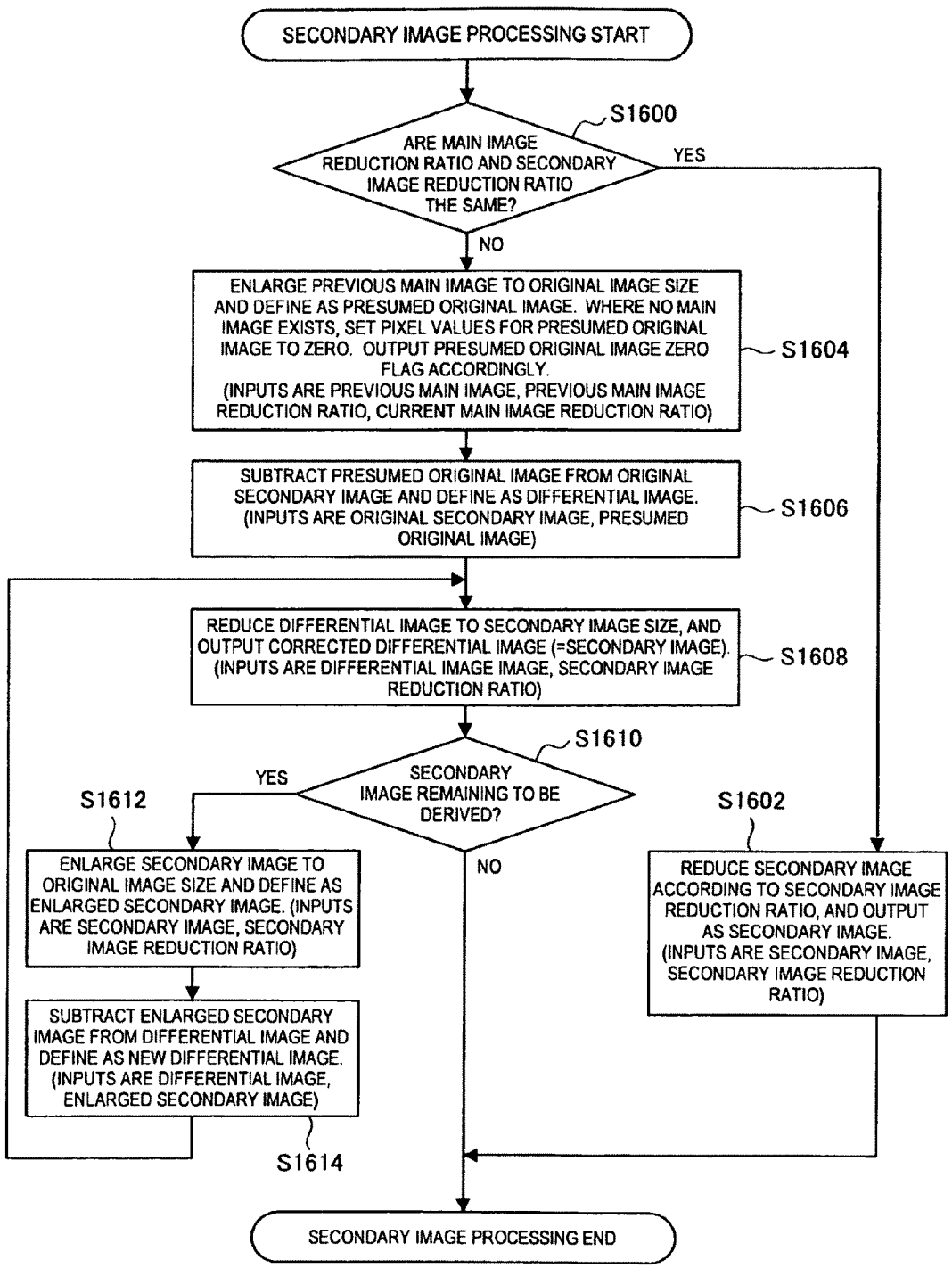
FIG. 30 is a flowchart that shows transmission side secondary image processing in a case where a differential image is processed at an original image size.
Figure 31:
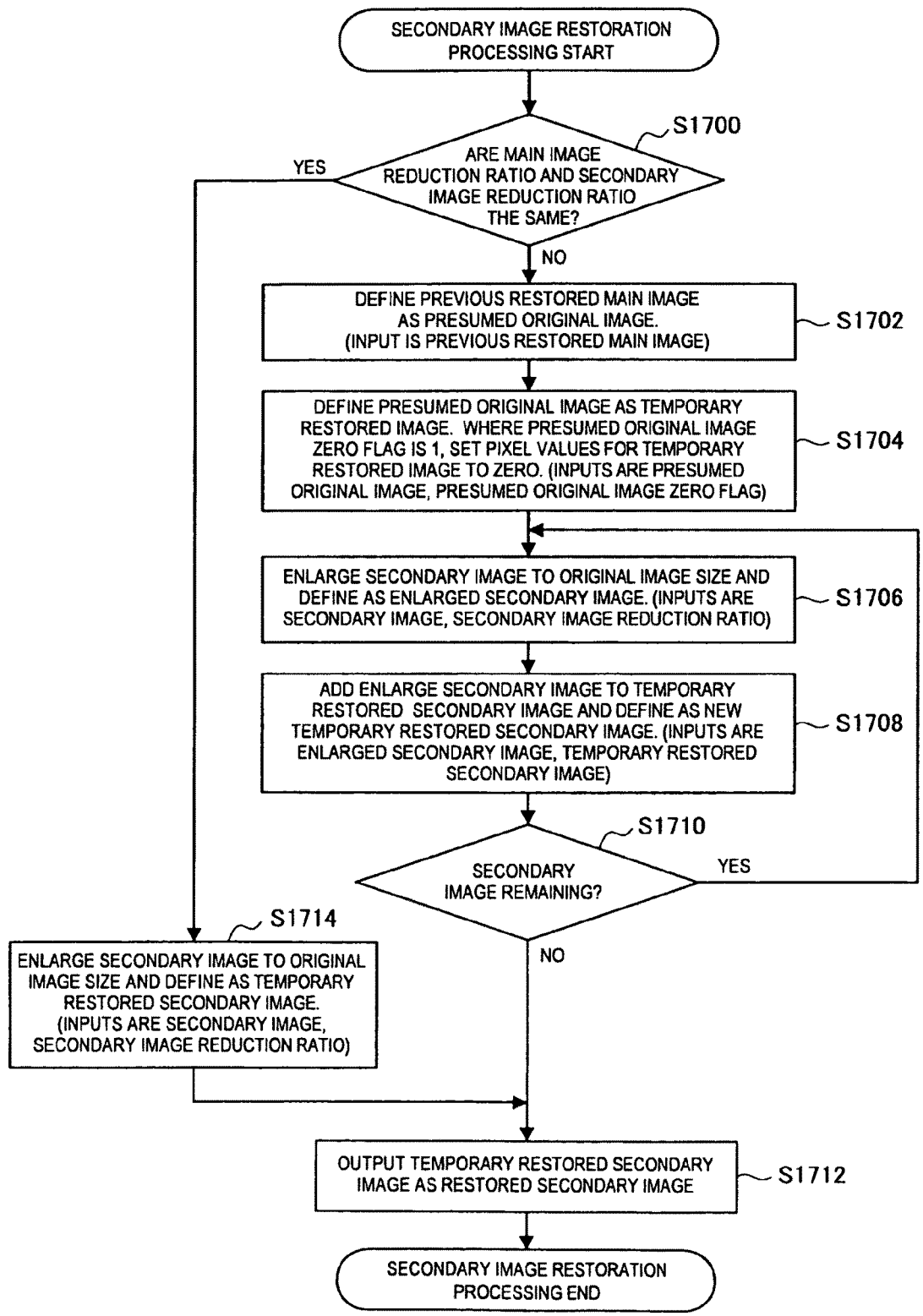
FIG. 31 is a flowchart that shows receiving side secondary image restoration processing in a case where the differential image is processed at the original image size.

In the flowcharts in FIGS. 30 and 31, a determination is first made as to whether or not the reduction ratios for the main image and the secondary image are the same. In a case where they are the same, the differential image is not used, the original secondary image is reduced as is on the transmission side, and on the receiving side, the unaltered secondary image is enlarged to the original image size and output. Note that for most content, it is considered more appropriate for the secondary image to be smaller than the main image, instead of the secondary image and main image sizes being equal, so it is not always the case that the processing in FIGS. 30 and 31 is necessary.

3. Third Embodiment

In the third embodiment, an example will be described that includes motion compensation. In the first embodiment, the presumed original image that is required in order to create the secondary image and in order to create the restored image from the secondary image is defined as the main image in the immediately previous integrated image. In the third embodiment, however, the presumed original image is created by referencing a plurality of main images and restored secondary images. Furthermore, in the third embodiment, processing is performed that detects motion between the main images and the restored secondary images and compensates for the motion, and the presumed original image is computed by weighted averaging.

Figure 32:
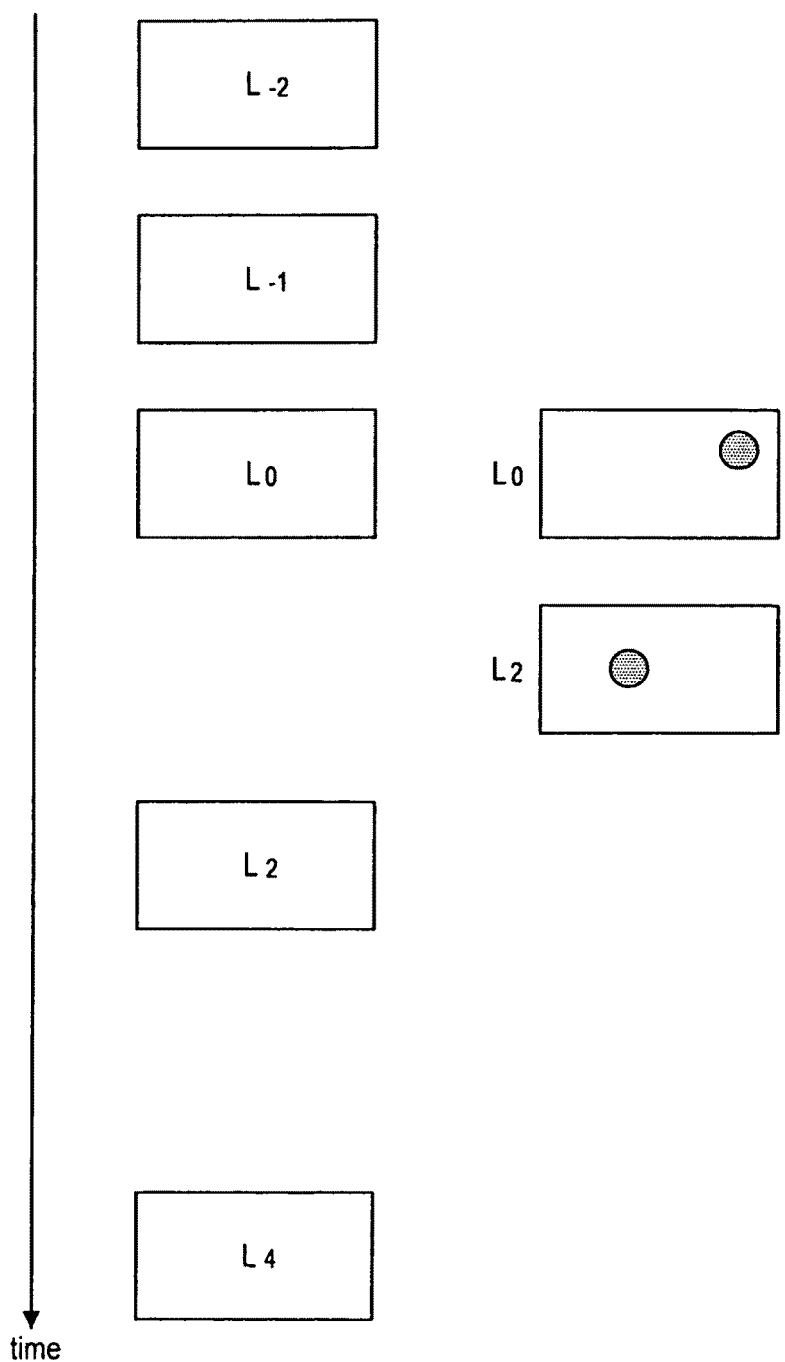
FIG. 32 is a schematic figure that shows a method for computing a presumed original image L1 in a current frame L2.

In the present embodiment, the presumed original image is computed using the immediately previous and the third and the fifth previous main images, the second and the fourth previous restored secondary images, which are the main image size, and the immediately following main image. FIG. 32 is a schematic figure that shows a method for computing a presumed original image L1 in a current frame L2. In this case, $L_0$, $L_{-2}$, and $L_{-4}$ are used as the immediately previous and the third and the fifth previous main images, $L_{-1}$ and $L_{-3}$ are used as the second and the fourth previous restored secondary images that are the main image size, and $L_2$ is used as the immediately following main image.

The motion detection and motion compensation processing divides the main image size images into blocks of eight pixels by eight pixels. The processing then determines which parts of the other images that the blocks match, rearranges the matching parts, and computes the presumed original image. Obviously, no particular restrictions are set on the number of the main images, the main image size, and the number of the restored secondary images that are used for the computation, and no particular restrictions are set on the motion detection method and the motion compensation method. The present embodiment can be applied to any number of images using any motion detection method and any motion compensation method.

Figure 17:
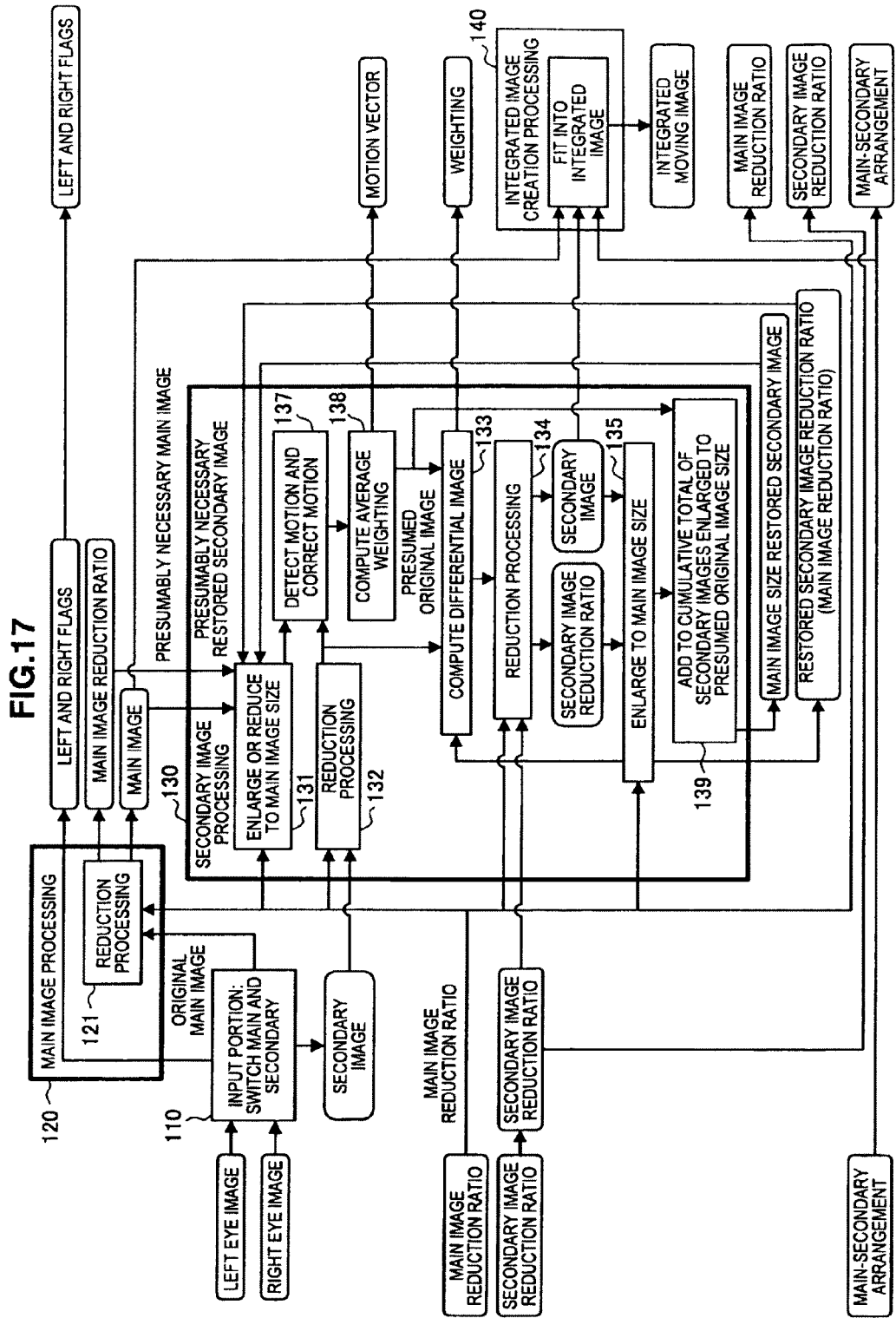
FIG. 17 is a schematic figure that shows processing blocks of a transmission device according to a third embodiment.

FIG. 17 is a schematic figure that shows the processing blocks of the transmission device 100 according to the third embodiment. In FIG. 17, the processing within the secondary image processing block is different from that in FIG. 5, and the input portion temporarily buffers the original secondary image and the secondary image reduction ratio. Moreover, in FIG. 17, the left and right flags and the main image that are output from the main image processing portion 120 are buffered, and the plurality of the main images and the main image reduction ratios that are required by the secondary image processing portion can be supplied, because a plurality of the main images and the main image reduction ratios that are output from the main image processing portion 120 can be buffered.

In FIG. 17, the main image size restored secondary images and the restored secondary image reduction ratios that are the outputs from the secondary image processing portion 130 are also buffered, so the main image size restored secondary images and the restored secondary image reduction ratios that are required by the secondary image processing can be supplied. Furthermore, in FIG. 17, averaged weightings are output instead of the presumed original image zero flag. The structural elements in FIG. 17 that are described above are different from those in FIG. 5.

Figure 7:
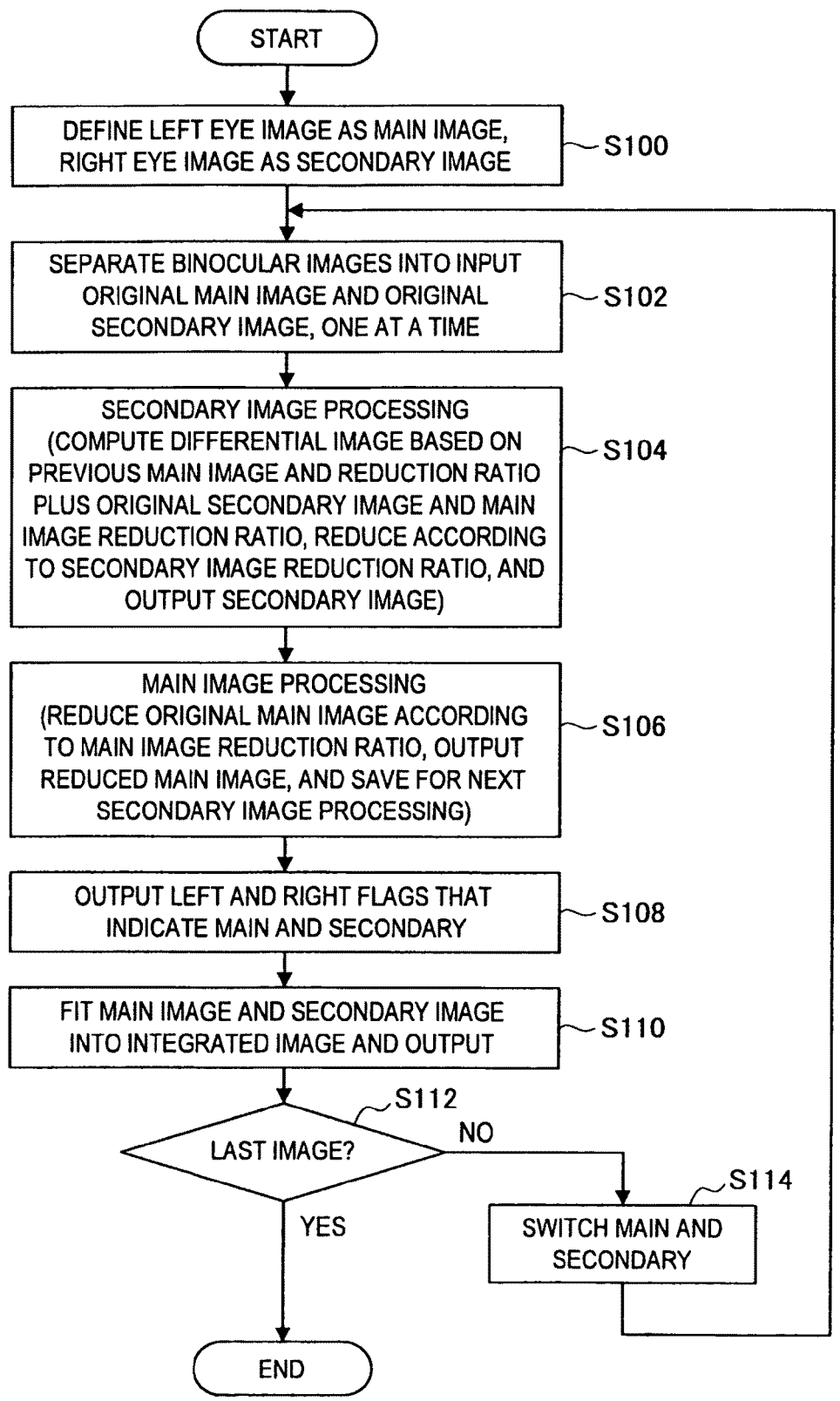
FIG. 7 is a transmission side flowchart that shows operations of the processing blocks in FIG. 5.
Figure 19:
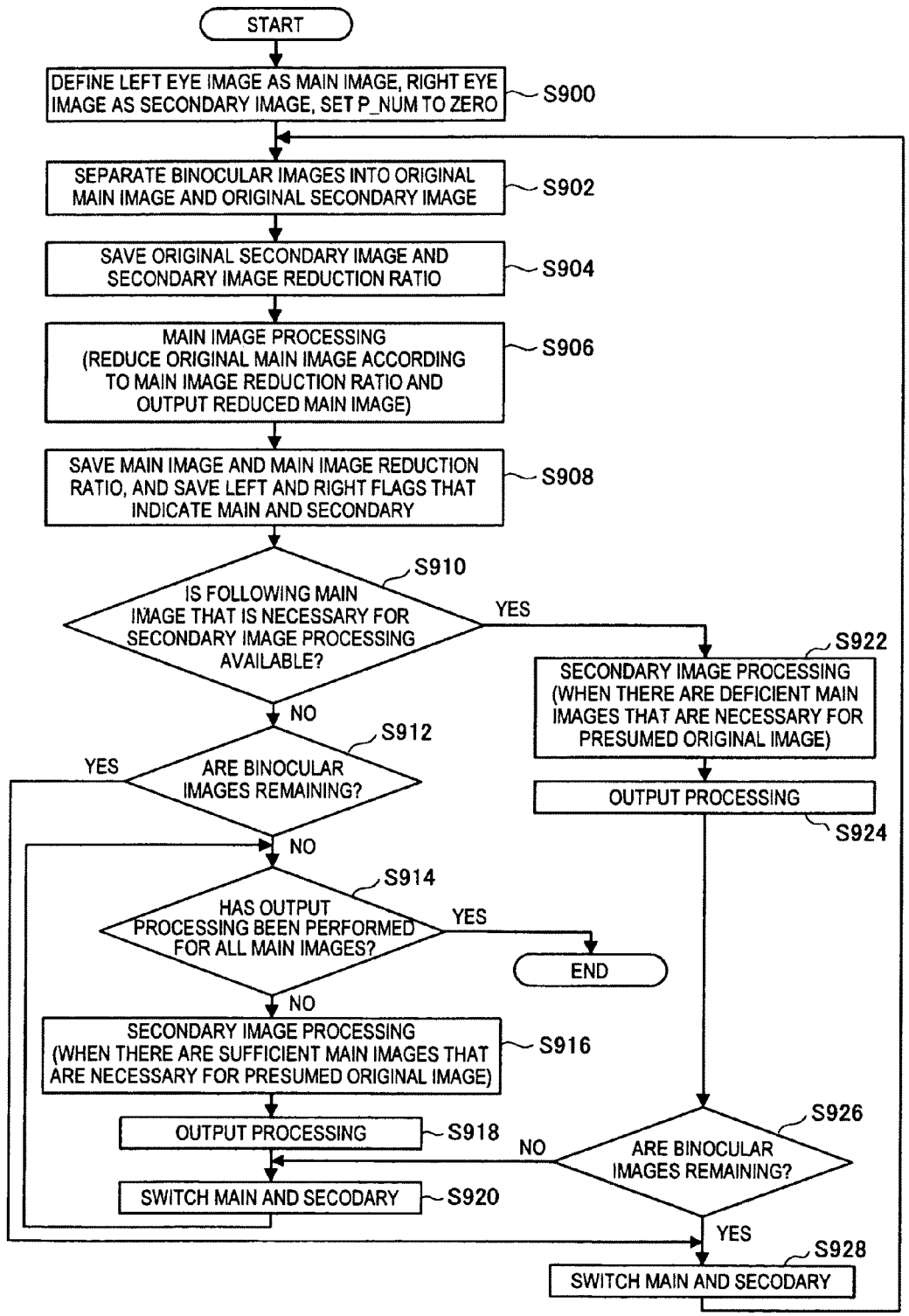
FIG. 19 is a flowchart that shows processing on a transmission side according to the third embodiment.

In conjunction with this modifications, the flowchart in FIG. 19 is a modified form of the flowchart in FIG. 7. First, the left and the right flags are respectively set to main and secondary, and an integrated image counter called p_num is set to zero (Step S900). The left and the right flags indicate which of the left eye image and the right eye image is the main image and which is the secondary image, and p_num is the image number of the integrated image, the counter value being set to zero for the first image and being incremented by 1 every time an integrated image is created.

The rest of the processing is a loop that processes all of the binocular images. First, the binocular images are separated into the original main image and the original secondary image in accordance with the left and right flags (Step S902), and then the original secondary image and the secondary image reduction ratio are saved (Step S904).

Next, the main image processing is performed in which the original main image is reduced according to the main image reduction ratio and the reduced main image is defined as the main image (Step S906). At this time, the main image and the main image reduction ratio are saved, and the left and the right flags that indicate the main image and the secondary image are also saved (Step S908). The data that are thus saved can be searched using image indices or the like that indicate to which of the plurality of images the data apply, starting with the first image, thus making it possible to identify the images that are required for the output processing and the secondary image processing.

At this point in the flowchart, a determination is made as to whether or not the following main image that is required for the secondary image processing is available, and the processing branches according to the result of the determination (Step S910). In the present embodiment, the immediately previous and the third and the fifth previous main images, the second and the fourth previous restored secondary images, which are the main image size, and the immediately following main image are used, so the following main image that is used for the secondary image processing of the secondary image that is indicated by p_num is the main image that is indicated by p_num+1.

Therefore, in the first round of the processing, no following main image is available, and the result of the determination is NO. Because binocular images are obviously still remaining, the result of the determination at the next branching point is YES, so the main and secondary settings of the left and right flags are switched at Step S928, and the loop processing is repeated. When the processing is repeated, the following main image (p_num+1) that is required for the secondary image processing is available, so the result of the determination at Step S910 is YES, and the secondary image processing (Step S922) and the output processing (Step S924) are performed for the secondary image that is indicated by p_num.

The loop processing is performed until all of the binocular images have been processed according to the determination at Step S926. Once the last binocular images have been divided into the main and secondary images and saved, and the branching processing, the secondary image processing, and the output processing have been performed, there are no more binocular images remaining. However, because the following main image is used, a discrepancy arises between the number of the images that are processed by the secondary image processing and the numbers of the main images and the secondary images that are saved, so the processing must be continued until all of the main images have been arranged in the integrated images and transmitted. Therefore, the main and secondary settings of the left and right flags are switched at Step S920, and the secondary image processing and the output processing are performed again without the following main image, such that the processing is terminated at the point when all of the saved original secondary images have been processed.

Figure 20:
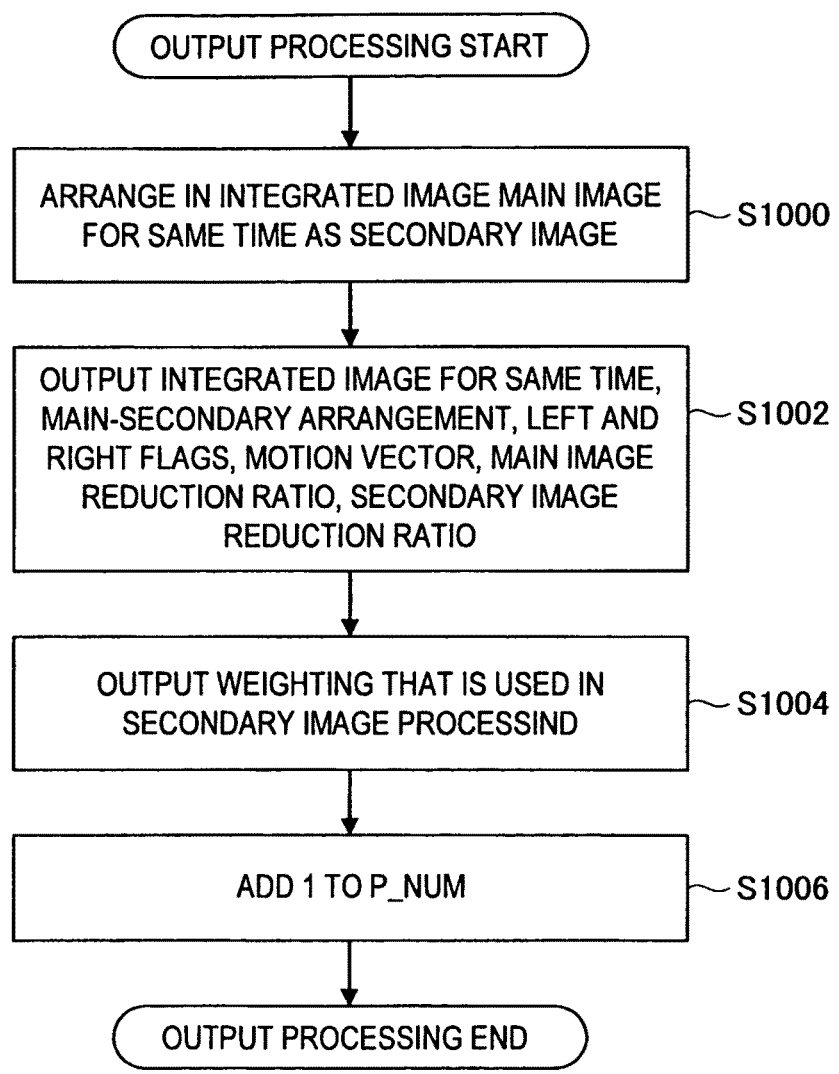
FIG. 20 is a flowchart that shows output processing in FIG. 19.

FIG. 20 is a flowchart that shows the output processing at Step S924 in FIG. 19. In the output processing in FIG. 20, the main image for the same time as the computed secondary image is arranged in the integrated image (Step S1000), the integrated image for the same time, the main-secondary arrangement, the left and the right flags, the main image reduction ratio, the secondary image reduction ratio, and a motion vector are output (Step S1002), and the weighting that is used in the computation of the presumed original image that is used for computing the secondary image is output (Step S1004). In the first round of the processing, a weighting of zero is designated for the not-yet-available following main image and for the restored secondary image. In the final round of the processing, when there is no following main image, a weighting of zero is also designated for the no-longer-available following main image. The processing on the receiving side is set up such that the weighting of zero for the unavailable image allows the same presumed original image to be created.

After the weighting has been output, p_num is incremented by 1 (Step S1006), p_num is defined as the image number for the integrated image that is to be processed next, and the output processing is terminated.

Figure 21:
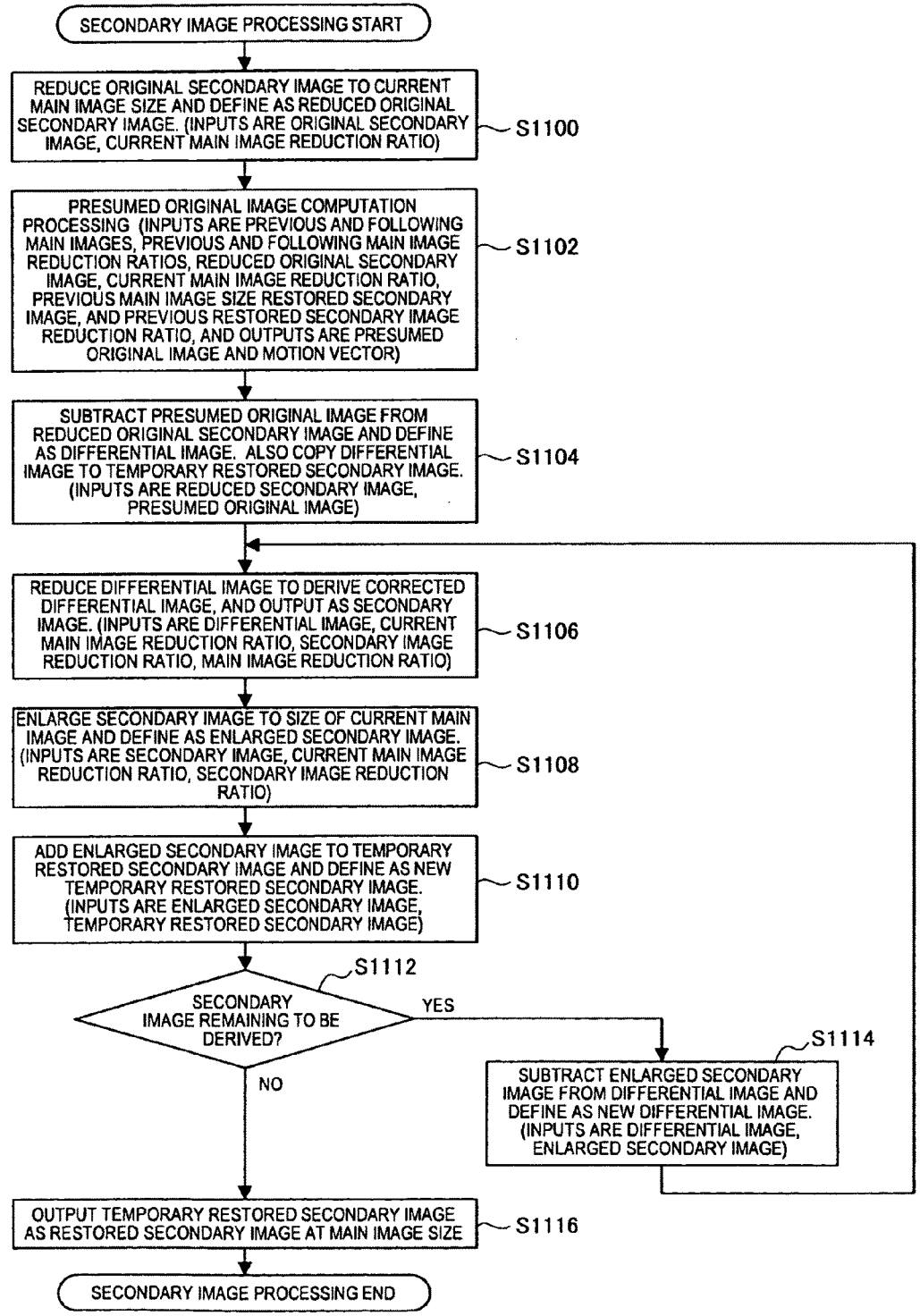
FIG. 21 is a flowchart that shows secondary image processing.

FIG. 21 is a flowchart that shows the secondary image processing at Step S922 in FIG. 19. In the secondary image processing in the present embodiment, the original secondary image is reduced to the current main image size and defined as the reduced original secondary image (Step S1100). Next, the presumed original image is computed by presumed original image computation processing that will be described later (Step S1102). Next, the presumed original image is subtracted from the reduced original secondary image to create the differential image, and the differential image is copied to a temporary restored secondary image (Step S1104). Thereafter, loop processing is performed as many times as there are secondary images to be derived.

The content of the loop processing will be described. First, the corrected differential image is derived by reducing the differential image, and the corrected differential image is then output as the secondary image (Step S1106). Next, the secondary image is enlarged to the current main image size and defined as the enlarged secondary image (Step S1108). Then the enlarged secondary image is added to the temporary restored secondary image, and the result is defined as the new temporary restored secondary image (Step S1110).

At Step S1112, a determination is made as to whether or not there is a secondary image remaining to be derived. At this point, if there is no secondary image remaining to be derived, the loop processing is terminated, and the temporary restored secondary image is output as the restored secondary image at the main image size (Step S1116). In a case where there is a secondary image remaining to be derived, the enlarged secondary image is subtracted from the differential image, and the result is defined as the new differential image (Step S1114), after which the loop processing is repeated.

Figure 22:
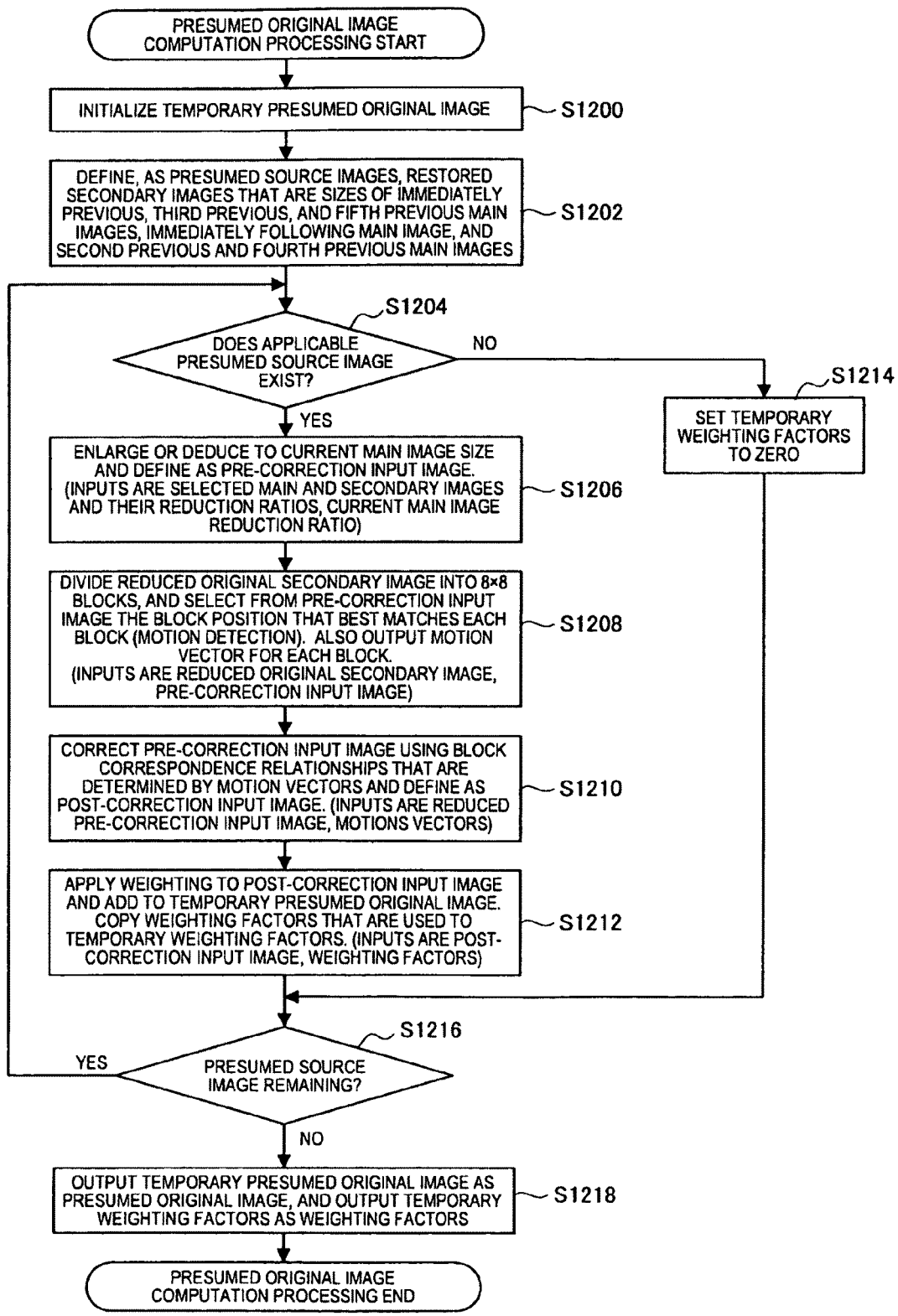
FIG. 22 is a flowchart of presumed original image computation processing at Step S1102 in FIG. 21.

FIG. 22 is a flowchart of the presumed original image computation processing at Step S1102 in FIG. 21. In the present embodiment, the presumed original image is computed from a plurality of images. The one presumed original image is computed based on the plurality of images using weighted averaging, so all of the pixel values in a temporary presumed original image are first initialized to zero (Step S1200), because the final presumed original image is produced by weighted summing of the pixel values. Note that details of a rounding method and the like that are used when assigning the weightings will not be explained, but there are no particular restrictions on the method.

As has already been explained, the presumed source images are defined as the three previous main images, the two previous secondary images, and the one following main image (Step S1202). Loop processing is performed on all of the presumed source images.

The content of the loop processing will be described. First, at Step S1204, a determination is made as to whether or not an applicable presumed source image exists. In a case where an applicable presumed source image does not exist, temporary weighting factors are set to zero, and the processing proceeds to the next presumed source image (Step S1214). Cases in which an applicable presumed source image does not exist include a case in which there is no image previous to the secondary image that is computed the first time that the binocular images are processed, for example, and a case in which there is no image that follows the secondary image that is computed the last time that the images are processed. In these cases, an image in which all of the pixels values are zero is posited as the presumed source image, so the processing that adds it to the temporary restored secondary image is not performed. The processing on the receiving side is handled in the same manner, so the weighting factors that apply to these cases are transmitted as zeroes.

In a case where an applicable presumed source image does exist, the applicable presumed source image is one of enlarged and reduced to the current main image size and defined as a pre-correction input image (Step S1206).

Next, the reduced original secondary image that was computed at the first step in the secondary image processing flowchart in FIG. 21 is divided into blocks of eight pixels by eight pixels. The block position in the pre-correction input image that most closely matches each of the blocks is selected, and the discrepancies between the matching positions are output as motion vectors (Step S1208).

The motion vectors are used to rearrange the matched blocks in the pre-correction input image to the matching block positions in the reduced original secondary image, and the result is output as a post-correction input image (Step S1210). In this state, the individual blocks in the post-correction input image and the reduced original secondary image have been matched, so the individual pixels in the post-correction input image are multiplied by the weighting factors that have been set for each of the presumed source images, and the results are added to the temporary presumed original image. The weighting factors are also copied to the temporary weighting factors (Step S1212).

At Step S1216, a determination is made as to whether or not there is a remaining presumed source image. At this point, if the processing has been completed for all of the presumed source images, the loop processing is terminated. The temporary presumed original image is then output as the presumed original image, and the temporary weighting factors are output as the weighting factors (Step S1218), after which the presumed original image computation processing is terminated. On the other hand, if there is a presumed source image remaining at Step S1216, the loop processing is repeated.

As described above, in the present embodiment, after motion detection and motion compensation are performed for the plurality of the presumed source images, the presumed original image can be computed using weighted averaging.

Exactly which of the main images and which of the restored secondary images at the main image size will be used, what size the blocks will be for which the motion detection and motion compensation are performed, and the like can be arranged in advance with the receiving side. In a case where such an arrangement is not made, the information can be transmitted from the transmission side, and the same presumed original image as on the transmission side can be created on the receiving side. For the main images, the main images that come after the current main image can be used as the presumed source images, but for the restored secondary images at the main image size, only the restored secondary images at the main image size that are previous to the current image can be used.

It must also be possible for the processing that computes the presumed original image to be performed on the receiving side. It is possible on the receiving side to produce the main images and the restored secondary images at the main image size that are previous to the current image, and if the processing of the integrated images that have arrived is delayed and the presumed source images are obtained from the integrated images that come after the integrated image that will be processed, the main images that are extracted from the integrated images can be used as the presumed source images only for enlargement and reduction, but the restoration processing must be performed for the secondary images, so they cannot be used as is. That is why the restrictions that are described above are imposed on the use of the presumed source images.

Figure 18:
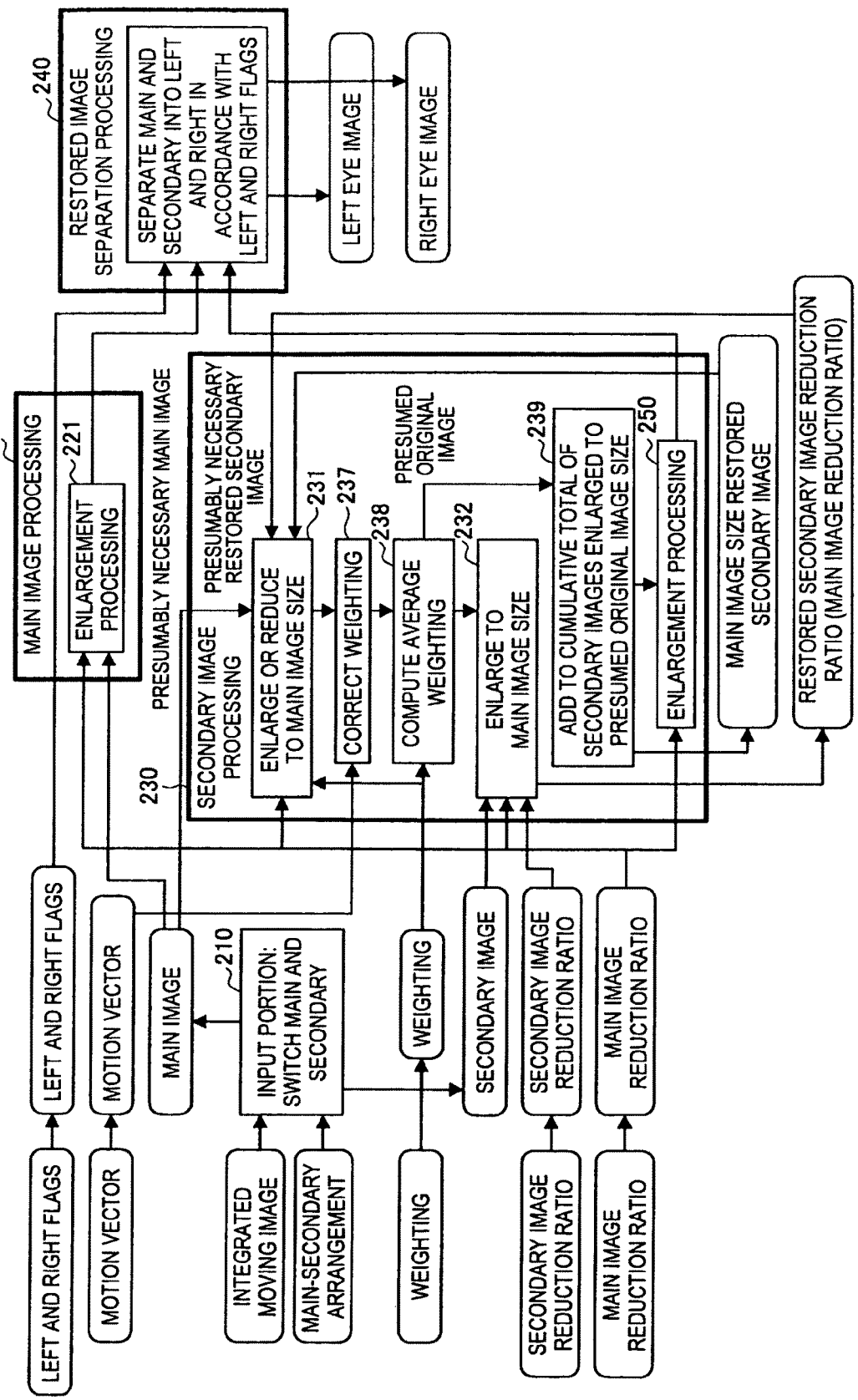
FIG. 18 is a schematic figure that shows processing blocks of a receiving device according to the third embodiment.

FIG. 18 is a schematic figure that shows the processing blocks of the receiving device 200 according to the present embodiment. The receiving side processing in the present embodiment uses as its inputs the integrated image, the main-secondary arrangement information, the main image reduction ratio, the secondary image reduction ratio, the left and right flags, the motion vectors, and the weighting factors, which are shown on the left side of FIG. 18, and outputs the left eye moving image and the right eye moving image.

In the same manner as in the first and the second embodiments, the input portion 210 separates the integrated image into the main image and the secondary image based on the main-secondary arrangement information. The separated main image and secondary image are temporarily buffered. The other inputs are also temporarily buffered. The buffering is done in order for the inputs to be used in the processing of the main images in the integrated images that arrive after the integrated image that will be processed in the secondary image processing.

The main image processing portion 220 is the same sort of processing as is done in the first and the second embodiments, and the main image is enlarged to the original image size using the main image reduction ratio. The enlargement processing is performed on the main image for the same time as the restored secondary image that was restored by the secondary image processing, and the left eye image and the right eye image are separated by the restored image separation processing. The left and the right flags for the same time as the restored secondary image are also used in the separation processing. A flowchart of the processing is shown in FIG. 23.

Figure 23:
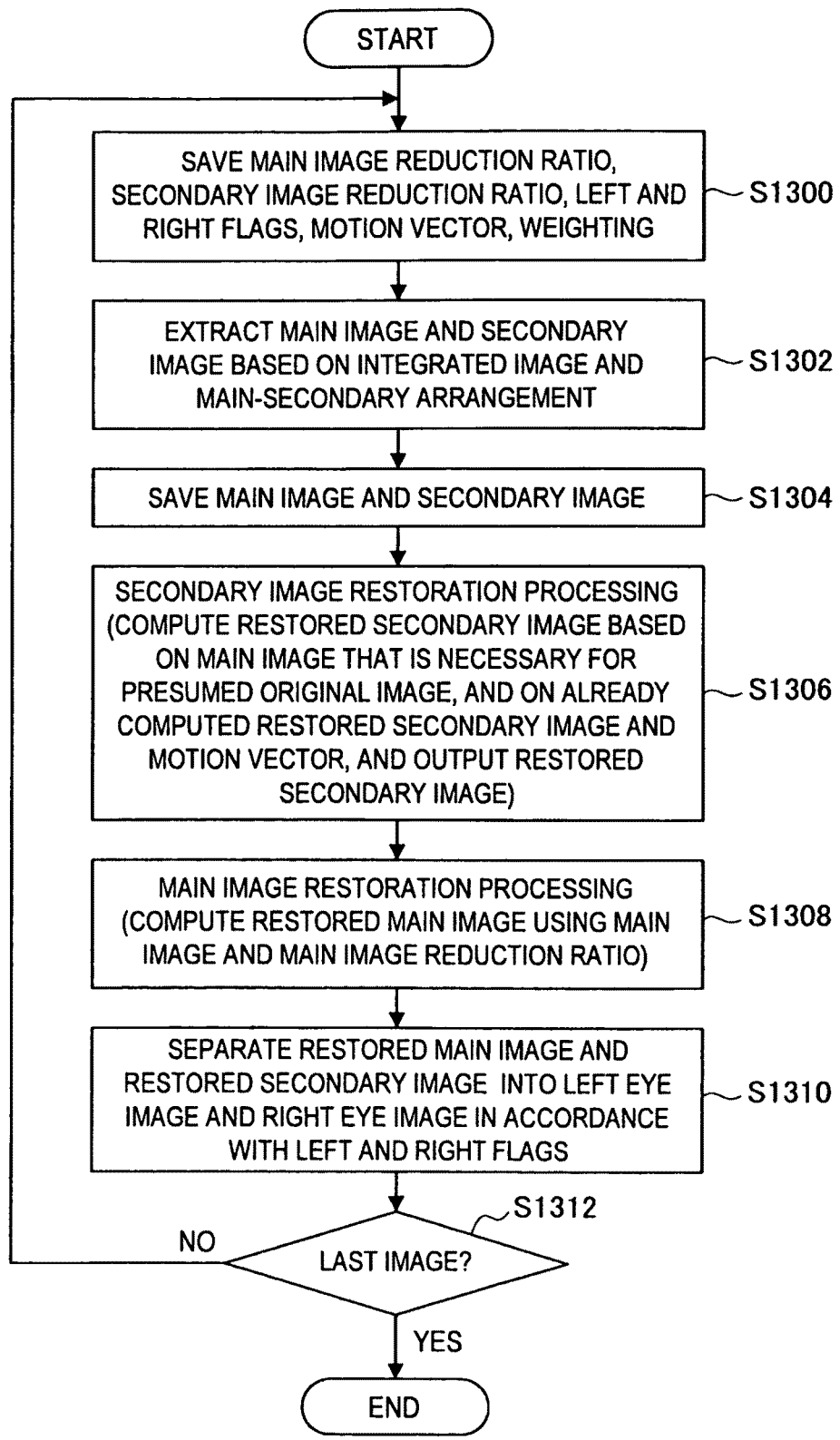
FIG. 23 is a flowchart that shows main image processing.
Figure 24:
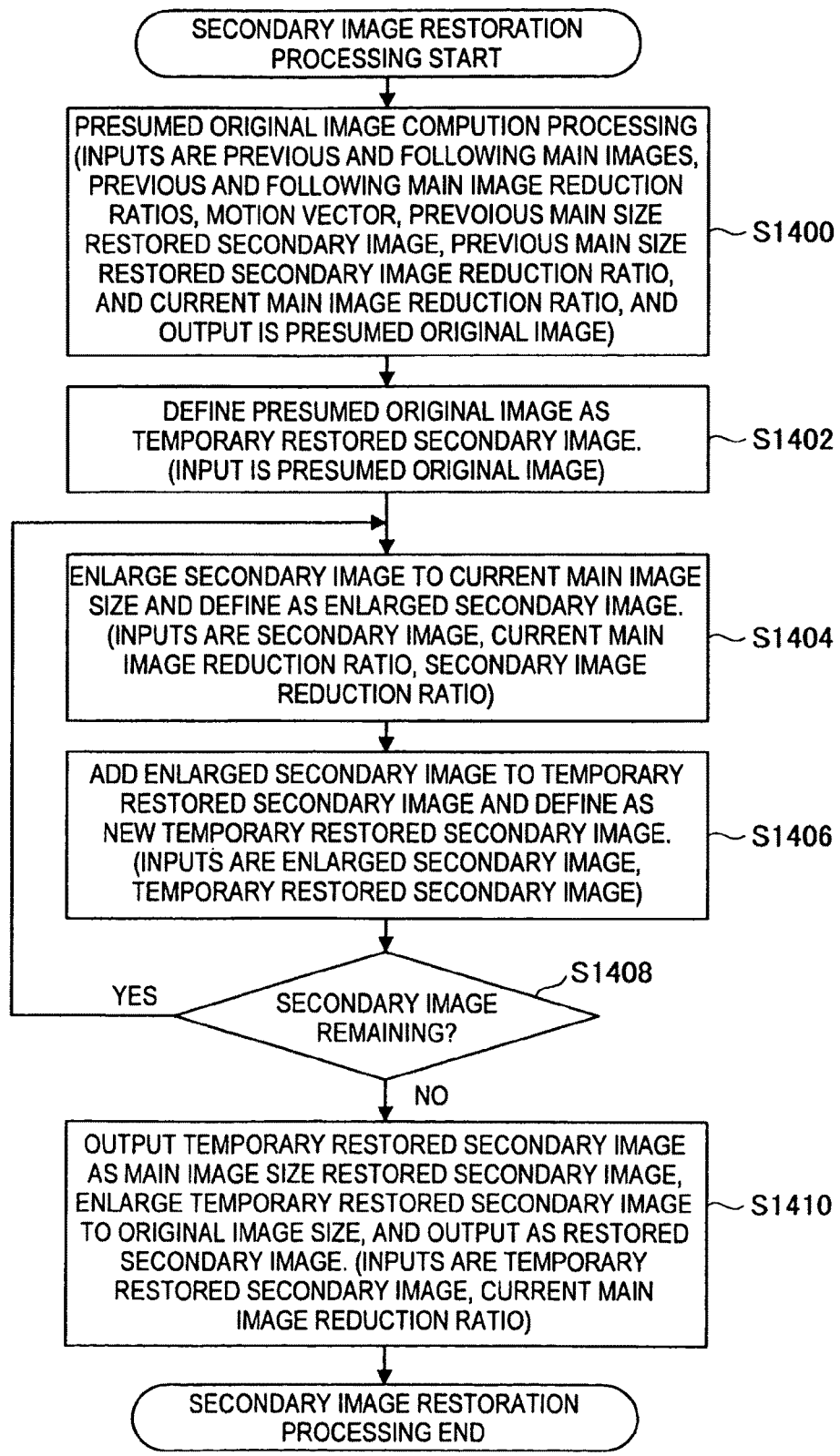
FIG. 24 is a flowchart that shows secondary image restoration processing at Step S1306 in FIG. 23.

FIG. 24 is a flowchart that shows the secondary image restoration processing at Step S1306 in FIG. 23. In the secondary image restoration processing, first, the presumed original image is computed by performing the presumed original image computation processing, which will be described later (Step S1400).

The presumed original image is defined as the temporary restored secondary image (Step S1402), and loop processing is then performed. First, the secondary image is enlarged to the current main image size (Step S1404). Next, the enlarged secondary image is added to the temporary restored secondary image, and the result is defined as the new temporary restored secondary image (Step S1406).

At Step S1408, a determination is made as to whether or not there is a secondary image remaining. After the loop processing has been performed for all of the secondary images, the temporary restored secondary image is saved as the restored secondary image at the main image size, is enlarged to the original image size, and is output as the restored secondary image at the original image size (Step S1410).

Figure 25:
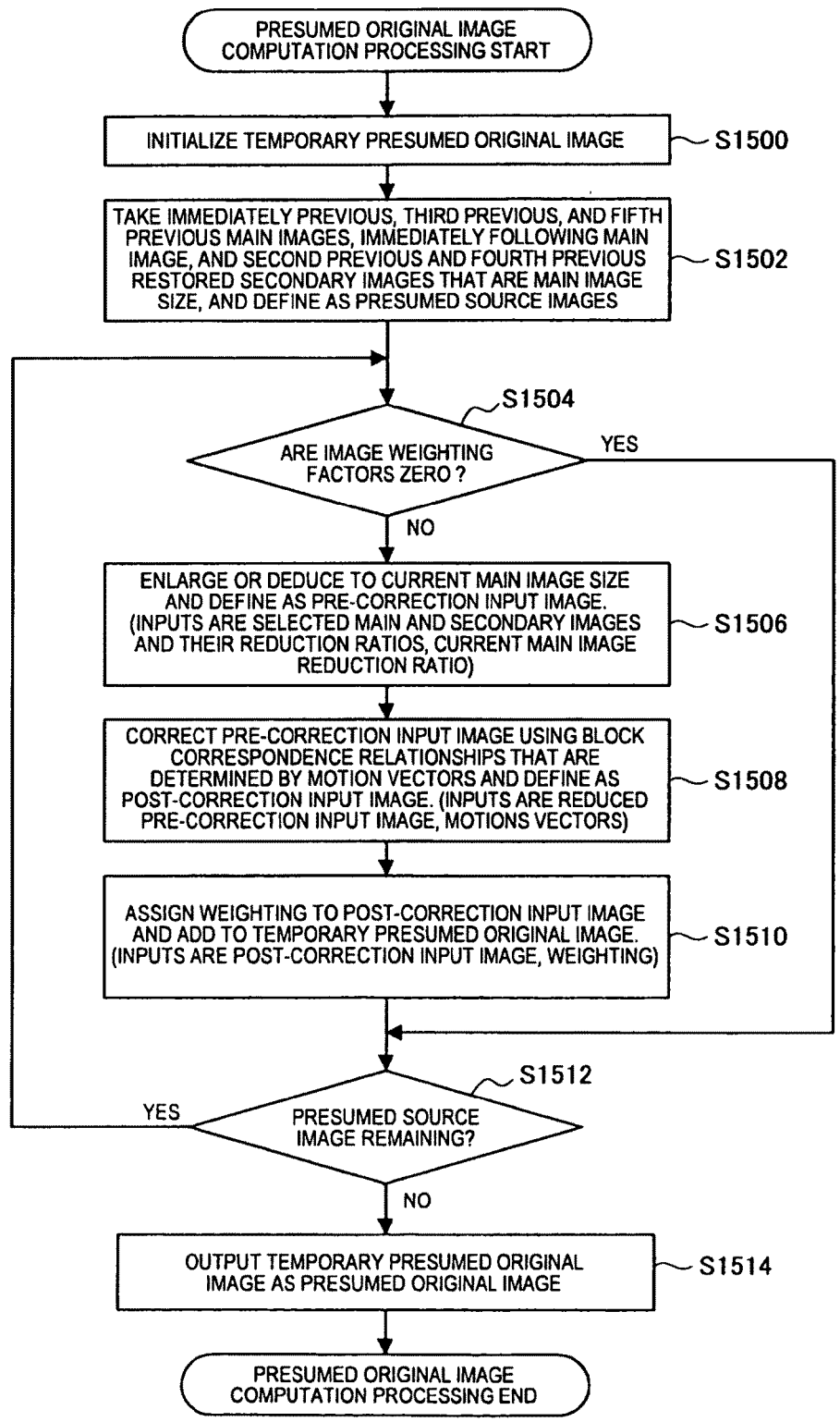
FIG. 25 is a flowchart that shows the presumed original image computation processing.

FIG. 25 is a flowchart that shows the presumed original image computation processing. First, all of the pixel values in a temporary presumed original image are first initialized to zero (Step S1500). As was already indicated for the transmission side processing, in the present embodiment, the immediately previous and the third and the fifth previous main images, the second and the fourth previous restored secondary images, and the immediately following main image are used.

These images are taken from a buffer and defined as the presumed source images (Step S1502), and the subsequent processing is performed for all of the presumed source images. However, the processing is not performed for an image for which it is determined at Step S1504 that the weighting factors are zero. An image for which the weighting factors are zero is one of enlarged and reduced to the current main image size and defined as the pre-correction input image (Step S1506).

Next, for each of the blocks of eight pixels by eight pixels in the post-correction input image, the corresponding block of eight pixels by eight pixels is extracted from the pre-correction input image and rearranged using the motion vectors, such that the post-correction input image is produced (Step S1508).

Once the post-correction input image has been derived and the weighting factors have been applied, the results are added to the temporary presumed original image (Step S1510). After the processing the described above has been performed for all of the presumed source images (Step S1512), the temporary presumed original image is output as the presumed original image (Step S1516).

The presumed original image computation processing according to the first, the second, and the third embodiments is only one example of the processing, and numerous other combinations are conceivable. For example, the presumed original image can be created by performing the motion compensation using only the immediately previous main image, and the presumed original image can also be created by taking the average (one of a simple average and a weighted average) of the immediately previous main image and the immediately following main image.

Furthermore, in the present embodiment, the processing of binocular stereoscopic images is described as being thought to be the most effective, but the effectiveness of the method that uses the secondary image that is based on the differential image in the time axis direction and transmits the secondary image in a form that is reduced in relation to the main image is not limited by the degree of resemblance between the stereoscopic moving images or the number of the moving images, and sufficient effect can be produced even in a case where the present invention is applied to a plurality of unrelated moving images.

The preferred embodiment of the present invention has been explained in detail above with reference to the attached drawings, but the present invention is not limited to this example. It should be understood by those possessing ordinary knowledge of the technical field of the present invention that various types of modified examples and revised examples are clearly conceivable within the scope of the technical concepts that are described in the appended claims, and that these modified examples and revised examples are obviously within the technical scope of the present invention.

What is claimed is:

1. An image transmission method, comprising the steps of:
inputting a plurality of different source moving images sequentially;
creating a main image for each frame from one of the plurality of different source images;
creating a secondary image for each frame from a differential image that expresses the difference between the source moving image from which the main image was created and another source moving image in a different frame;
creating an integrated image by combining the main image and the secondary image; and
transmitting the integrated image to a receiving side,
the creating of the main image includes reducing a size thereof in relation to an original size of the respective source moving image in accordance with a main image reduction ratio and the creating of the secondary image includes reducing a size thereof in relation to an original size of the respective source moving image in accordance with a secondary reduction ratio,
in which the main image reduction ratio is different from the secondary reduction ratio,
in which each of the main image reduction ratio and the secondary reduction ratio has a respective value so as to enable the main image and the secondary image to be sized such that the integrated image created therefrom has a size equivalent to that of the original size of the respective moving image, and
in which the plurality of different source moving images represent right eye and left eye moving images, such that (i) a first respective main image is created for a respective right eye moving image and a first respective secondary image is created therefor from a respective differential image that expresses the difference between the respective right eye moving image from which the respective main image was created and another right eye moving image in a different frame and a first respective integrated image is created by combining the first respective main image and the first respective secondary image, and (ii) a second respective main image is created for a respective left eye moving image and a second respective secondary image is created therefor from a respective differential image that expresses the difference between the respective left eye moving image from which the second respective main image was created and another left eye moving image in a different frame and a second respective integrated image is created by combining the second respective main image and the second respective secondary image, and such that the value of the main image reduction ratio and that of the secondary reduction ratio enable (i) both the first respective main image and the first respective secondary image to be sized so that the size of the first respective integrated image created therefrom is equivalent to the original size of the respective right eye moving image and (ii) both the second respective main image and the second respective secondary image to be sized so that the size of the second respective integrated image created therefrom is equivalent to the original size of the respective left eye moving image.

2. The image transmission method according to claim 1, wherein the secondary image is created by reducing the differential image that expresses the difference between the frames.

3. An image transmission method, comprising the steps of:
inputting a plurality of different source moving images sequentially;
creating a main image for each frame from one of the plurality of different source images;
creating a secondary image for each frame from a differential image that expresses the difference between the source moving image from which the main image was created and another source moving image in a different frame;
creating an integrated image by combining the main image and the secondary image; and
transmitting the integrated image to a receiving side,
wherein the secondary image is created by performing correction processing on a differential image that is derived by subtracting from the original other source moving image for the current frame a presumed original image that is derived from a series of images that precede and follow the other source moving image on a time axis,
the correction processing is processing that creates at least one corrected differential image in relation to a number S of corrected differential images that will be transmitted,
a corrected differential image 1 is an image that is derived by performing, on a differential image that expresses the difference between a presumed original image and one of an original image and a reduced original image, reduction processing at a reduction ratio that is based on an arrangement within the image that will be transmitted, and
a corrected differential image n (where n is at least 2 and not greater than S) is an image that is derived by performing the reduction processing at the reduction ratio that is based on the arrangement within the image that will be transmitted, the reduction processing being performed on a differential image that is computed by subtracting, from one of the original image and the reduced original image, an enlarged corrected differential image 1 to an enlarged corrected differential image (n-1) that are derived by enlarging the corrected differential image 1 to the corrected differential image (n-1) to the same size as the presumed original image.

4. An image transmission device, comprising:
an input portion to which a plurality of different source moving images are sequentially input;
a main image processing portion that creates a main image for each frame from one of the plurality of different source images;
a secondary image processing portion that creates a secondary image for each frame from a differential image that expresses the difference between the source moving image from which the main image was created and another source moving image in a different frame; and
an integrated image creation processing portion that creates an integrated image by combining the main image and the secondary image,
the main image processing portion in creating the main image performs a process of reducing a size thereof in relation to an original size of the respective source moving image in accordance with a main image reduction ratio and the secondary image processing portion in creating the secondary image performs a process of reducing a size thereof in relation to an original size of the respective source moving image in accordance with a secondary reduction ratio, in which the main image reduction ratio is different from the secondary reduction ratio, in which each of the main image reduction ratio and the secondary reduction ratio has a respective value so as to enable the main image and the secondary image to be sized such that the integrated image created therefrom has a size equivalent to that of the original size of the respective moving image, and in which the plurality of different source moving images represent right eye and left eye moving images, such that (i) a first respective main image is created for a respective right eye moving image and a first respective secondary image is created therefor from a respective differential image that expresses the difference between the respective right eye moving image from which the respective main image was created and another right eye moving image in a different frame and a first respective integrated image is created by combining the first respective main image and the first respective secondary image, and (ii) a second respective main image is created for a respective left eye moving image and a second respective secondary image is created therefor from a respective differential image that expresses the difference between the respective left eye moving image from which the second respective main image was created and another left eye moving image in a different frame and a second respective integrated image is created by combining the second respective main image and the second respective secondary image, and such that the value of the main image reduction ratio and that of the secondary reduction ratio enable (i) both the first respective main image and the first respective secondary image to be sized so that the size of the first respective integrated image created therefrom is equivalent to the original size of the respective right eye moving image and (ii) both the second respective main image and the second respective secondary image to be sized so that the size of the second respective integrated image created therefrom is equivalent to the original size of the respective left eye moving image.

5. An image transmission system, comprising:

an image transmission device that includes an input portion to which a plurality of different source moving images are sequentially input, includes a main image processing portion that creates a main image for each frame from one of the plurality of different source images, includes a secondary image processing portion that creates a secondary image for each frame from a differential image that expresses the difference between the source moving image from which the main image was created and another source moving image in a different frame, and includes an integrated image creation processing portion that creates an integrated image by combining the main image and the secondary image; and an image receiving device that includes a separation portion that receives an integrated image that includes a main image that is created from one of a plurality of different source images and a secondary image that is created from a differential image that expresses the difference between a source moving image that corresponds to the main image and another source moving image in a different frame, and that separates the main image and the secondary image from the integrated image, includes a main image restoration portion that restores the source moving image that corresponds to the main image, includes a secondary image restoration portion that restores the source moving image that corresponds to the secondary image, based on the main image for an adjacent frame and on the separated secondary image, and includes a display portion that displays the source moving images that respectively correspond to the main image and the secondary image, the main image processing portion in creating the main image performs a process of reducing a size thereof in relation to an original size of the respective source moving image in accordance with a main image reduction ratio and the secondary image processing portion in creating the secondary image performs a process of reducing a size thereof in relation to an original size of the respective source moving image in accordance with a secondary reduction ratio, in which the main image reduction ratio is different from the secondary reduction ratio and in which each of the main image reduction ratio and the secondary reduction ratio has a respective value so as to enable the main image and the secondary image to be sized such that the integrated image created therefrom has a size equivalent to that of the original size of the respective moving image, and in which the plurality of different source moving images represent right eye and left eye moving images, such that (i) a first respective main image is created for a respective right eye moving image and a first respective secondary image is created therefor from a respective differential image that expresses the difference between the respective right eye moving image from which the respective main image was created and another right eye moving image in a different frame and a first respective integrated image is created by combining the first respective main image and the first respective secondary image, and (ii) a second respective main image is created for a respective left eye moving image and a second respective secondary image is created therefor from a respective differential image that expresses the difference between the respective left eye moving image from which the second respective main image was created and another left eye moving image in a different frame and a second respective integrated image is created by combining the second respective main image and the second respective secondary image, and such that the value of the main image reduction ratio and that of the secondary reduction ratio enable (i) both the first respective main image and the first respective secondary image to be sized so that the size of the first respective integrated image created therefrom is equivalent to the original size of the respective right eye moving image and (ii) both the second respective main image and the second respective secondary image to be sized so that the size of the second respective integrated image created therefrom is equivalent to the original size of the respective left eye moving image.

* * * * *